(12) United States Patent
Tani

(10) Patent No.: US 11,749,250 B2
(45) Date of Patent: Sep. 5, 2023

(54) NOISE REDUCTION DEVICE, VEHICLE, AND NOISE REDUCTION METHOD

(71) Applicant: Panasonic Intellectual Property Management Co., Ltd., Osaka (JP)

(72) Inventor: Mitsuhiro Tani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/573,079

(22) Filed: Jan. 11, 2022

(65) Prior Publication Data
US 2022/0223134 A1    Jul. 14, 2022

(30) Foreign Application Priority Data

Jan. 12, 2021    (JP) .................................. 2021-003086

(51) Int. Cl.
*G10K 11/178*    (2006.01)
*B60Q 9/00*    (2006.01)

(52) U.S. Cl.
CPC .. *G10K 11/17854* (2018.01); *G10K 11/17823* (2018.01); *G10K 11/17881* (2018.01); *B60Q 9/00* (2013.01); *G10K 11/17825* (2018.01); *G10K 2210/12821* (2013.01); *G10K 2210/3026* (2013.01); *G10K 2210/3027* (2013.01); *G10K 2210/3028* (2013.01)

(58) Field of Classification Search
CPC .............................................. G10K 11/17833
See application file for complete search history.

(56) References Cited

U.S. PATENT DOCUMENTS

| 2015/0063581 | A1  | 3/2015  | Tani et al. |
| 2019/0019493 | A1* | 1/2019  | Yano .................. G10K 11/1781 |
| 2019/0071026 | A1* | 3/2019  | Terashima ........... G10K 11/175 |
| 2020/0365133 | A1* | 11/2020 | Pignier ............ G10K 11/17833 |
| 2021/0014593 | A1* | 1/2021  | Araki ....................... H04R 3/02 |
| 2022/0180852 | A1* | 6/2022  | Bou Daher .............. H04R 3/00 |

FOREIGN PATENT DOCUMENTS

| JP | 05-024483 | 2/1993 |
| JP | 06-250671 | 9/1994 |
| JP | 08-076774 | 3/1996 |
| JP | 2002-311960 | 10/2022 |
| WO | 2014/006846 | 1/2014 |
| WO | WO-2019187841 A1 * 10/2019 ....... G10K 11/17823 |

\* cited by examiner

*Primary Examiner* — Ping Lee
(74) *Attorney, Agent, or Firm* — Greenblum & Bernstein, P.L.C.

(57) ABSTRACT

An active noise reduction device includes a first adaptive filter, a first filter coefficient updater, and a controller that determines, based on a first parameter of the first adaptive filter, whether first noise control based on a first cancelling sound is in a stable state or an unstable state. The controller transitions the first filter coefficient updater to a restriction state in which an effect of reducing first noise is smaller than in a normal state when it is determined that the first noise control is in the unstable state while the first filter coefficient updater is updating a coefficient of the first adaptive filter in the normal state, and transitions the first filter coefficient updater back to the normal state when it is determined that the first noise control is in the stable state while the first filter coefficient updater is in the restriction state.

16 Claims, 13 Drawing Sheets

NOISE REDUCTION DEVICE, VEHICLE, AND NOISE REDUCTION METHOD

CROSS REFERENCE TO RELATED APPLICATION

The present application is based on and claims priority of Japanese Patent Application No. 2021-3086 filed on Jan. 12, 2021.

FIELD

The present disclosure relates to an active noise reduction device that actively reduces noise by interfering a cancelling sound with the noise, a vehicle that includes the active noise reduction device, and an active noise reduction method.

BACKGROUND

Conventionally, an active noise reduction device is known that actively reduces noise by outputting a cancelling sound for cancelling out the noise from a cancelling sound source by using a reference signal that has a correlation with the noise and an error signal that is based on a residual sound generated through the interference between the noise and the cancelling sound in a predetermined space (see, for example, PTL 1). The active noise reduction device generates a cancelling signal for outputting the cancelling sound by using an adaptive filter so as to minimize the sum of squares of the error signal.

CITATION LIST

Patent Literature

PTL 1: WO 2014/006846

SUMMARY

The present disclosure provides an active noise reduction device capable of improving upon the above related art.

An active noise reduction device according to one aspect of the present disclosure includes: a first reference signal inputter to which a first reference signal that has a correlation with first noise in a space in a vehicle is input, the first reference signal being output by a first reference signal source attached to the vehicle; a first adaptive filter that generates a first cancelling signal by applying a first adaptive filter to the first reference signal that is input to the first reference signal inputter, the first cancelling signal being used to output a first cancelling sound for reducing the first noise; a first filter coefficient updater that updates a coefficient of the first adaptive filter; and a controller that determines, based on a first parameter of the first adaptive filter, whether first noise control based on the first cancelling sound is in a stable state or an unstable state. The controller transitions the first filter coefficient updater to a restriction state in which an effect of reducing the first noise is smaller than in a normal state when it is determined that the first noise control is in the unstable state while the first filter coefficient updater is updating the coefficient of the first adaptive filter in the normal state, and transitions the first filter coefficient updater back to the normal state when it is determined that the first noise control is in the stable state while the first filter coefficient updater is in the restriction state.

The active noise reduction device according to one aspect of the present disclosure is capable of improving upon the above related art.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure.

DESCRIPTION OF EMBODIMENTS

Figure 1:
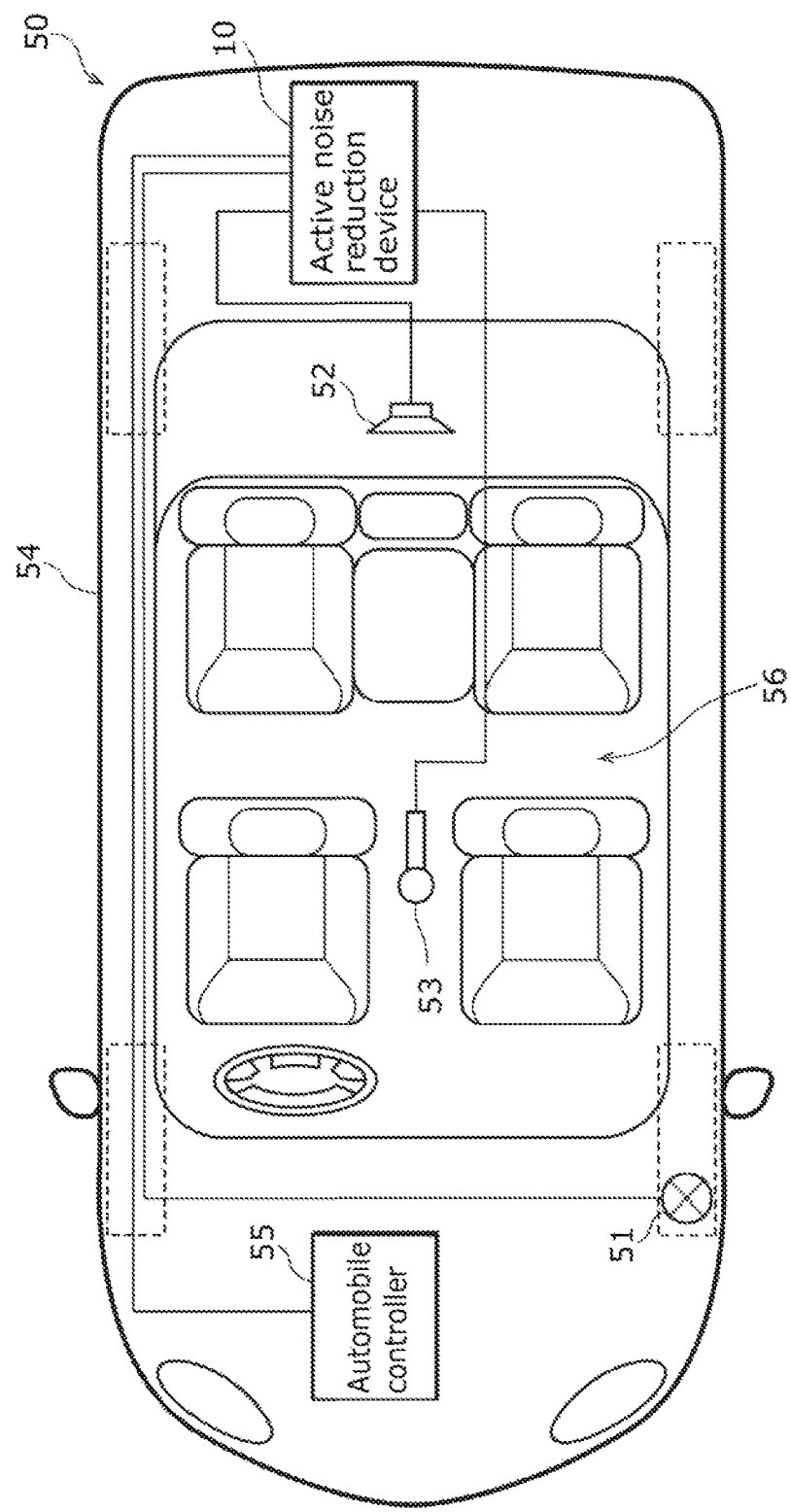
FIG. 1 is a schematic diagram of an automobile according to Embodiment 1 as viewed from above.

Hereinafter, embodiments will be described specifically with reference to the drawings. The embodiments described below shows generic or specific examples of the present disclosure. The numerical values, shapes, materials, structural elements, the arrangement and connection of the structural elements, steps, the order of the steps, and the like shown in the following embodiments are merely examples, and therefore are not intended to limit the scope of the present disclosure. Also, among the structural elements described in the following embodiments, structural elements not recited in any one of the independent claims are described as arbitrary structural elements.

Also, the diagrams are schematic representations, and thus are not necessarily true to scale. Also, in the diagrams, structural elements that are substantially the same are given the same reference numerals, and a redundant description may be omitted or simplified.

Embodiment 1

[Configuration of Automobile]

Hereinafter, an automobile according to Embodiment 1 and an active noise reduction device that is mounted on the automobile will be described. First, the automobile according to Embodiment 1 will be described. FIG. 1 is a schematic diagram of the automobile according to Embodiment 1 as viewed from above.

Automobile 50 is an example of a vehicle, and includes active noise reduction device 10 according to Embodiment 1, first reference signal source 51, cancelling sound source 52, error signal source 53, automobile main body 54, and automobile controller 55. Automobile 50 is specifically a passenger car, but the present disclosure is not limited thereto.

First reference signal source 51 is a transducer that outputs a reference signal that has a correlation with noise in space 56 of a cabin of automobile 50. In Embodiment 1, first reference signal source 51 is an acceleration sensor, and is provided outside space 56. Specifically, first reference signal source 51 is attached to the subframe near the left front wheel (or, the wheelhouse of the left front wheel).

However, there is no particular limitation on the attachment position of first reference signal source 51. In the case where first reference signal source 51 is an acceleration sensor, active noise reduction device 10 can reduce a roadway noise component (an example of first noise) that is included in the noise in space 56. The roadway noise has a complex propagation path, and it is therefore advantageous to provide acceleration sensors at a plurality of locations. Here, first reference signal source 51 may be a microphone.

Cancelling sound source 52 outputs a first cancelling sound to space 56 by using a first cancelling signal. In Embodiment 1, cancelling sound source 52 is a speaker, but the cancelling sound may be output as a result of one (for example, sunroof or the like) of the structural bodies of automobile 50 being vibrated by a driving mechanism such as an actuator. Also, in active noise reduction device 10, a plurality of cancelling sound sources 52 may be used, and there is no particular limitation on the attachment positions of cancelling sound sources 52.

Error signal source 53 detects a residual sound generated by interference between the noise and the cancelling sound in space 56, and outputs an error signal based on the residual sound. It is desirable that error signal source 53 is a transducer such as a microphone and is disposed in space 56 such as a headliner. Here, automobile 50 may include a plurality of error signal sources 53.

Automobile main body 54 is a structural body that includes a chassis, a body, and the like of automobile 50. Automobile main body 54 forms space 56 (the space in the automobile cabin) in which cancelling sound source 52 and error signal source 53 are disposed.

Automobile controller 55 controls (drives) automobile 50 based on operations and the like of the driver of automobile 50. Also, automobile controller 55 outputs an automobile state signal that indicates the state of automobile 50 to active noise reduction device 10. Automobile controller 55 is, for example, an ECU (Electronic Control Unit), and is specifically implemented by using a processor, a microcomputer, a dedicated circuit, or the like.

Automobile controller 55 may be implemented by a combination of two or more of a processor, a microprocessor, and a dedicated circuit.

[Configuration of Active Noise Reduction Device]

Figure 2:
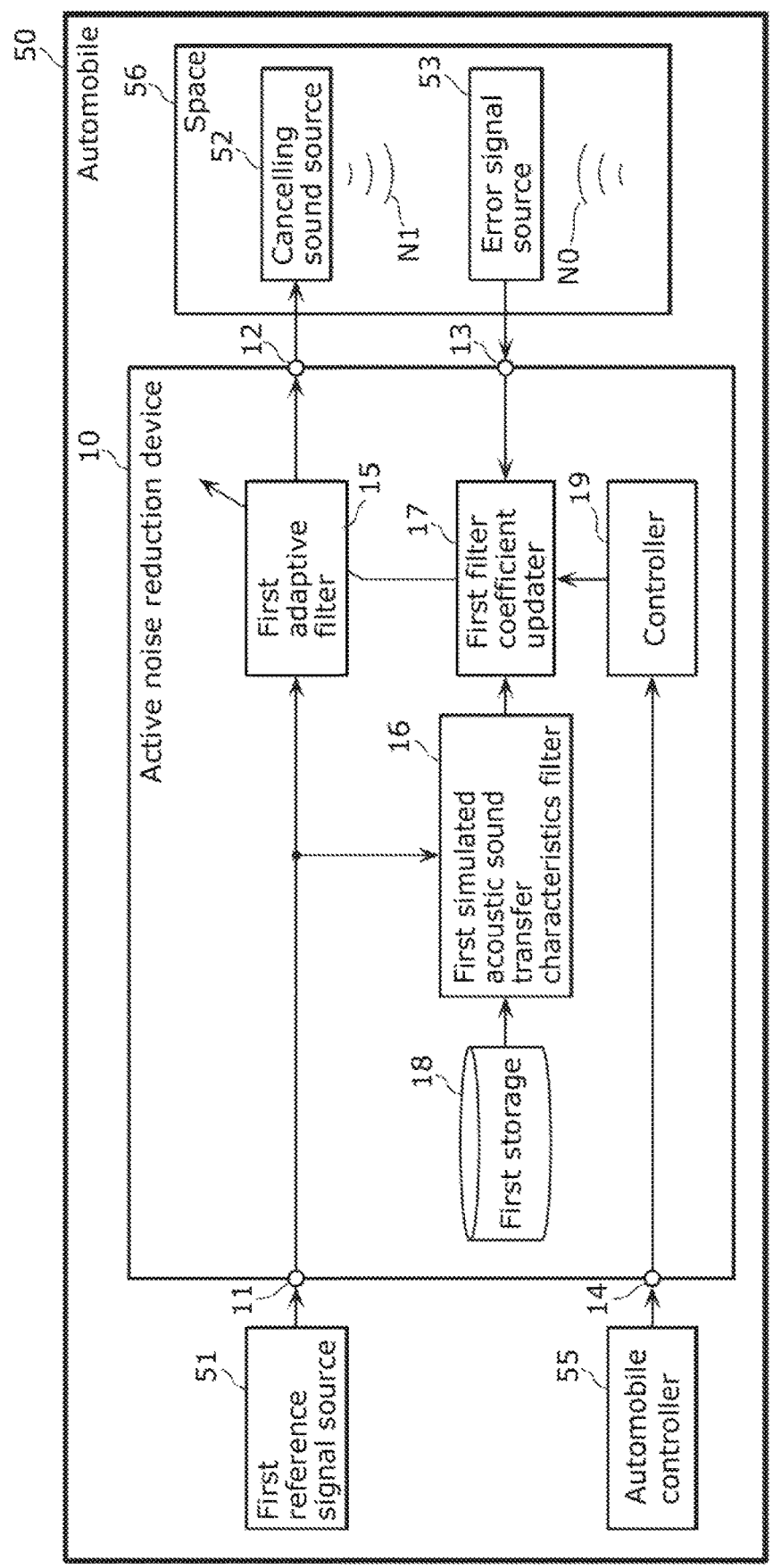
FIG. 2 is a block diagram showing a functional configuration of an active noise reduction device according to Embodiment 1.

Next, a configuration of active noise reduction device 10 will be described. FIG. 2 is a block diagram showing a functional configuration of active noise reduction device 10.

As shown in FIG. 2, active noise reduction device 10 includes first reference signal input terminal 11, cancelling signal output terminal 12, error signal input terminal 13, automobile state signal input terminal 14, first adaptive filter 15, first simulated acoustic sound transfer characteristics filter 16, first filter coefficient updater 17, first storage 18, and controller 19. First adaptive filter 15, first simulated acoustic sound transfer characteristics filter 16, first filter coefficient updater 17, and controller 19 are implemented by, for example, a processor such as a DSP (Digital Signal Processor) or a microcomputer executing software. First adaptive filter 15, first simulated acoustic sound transfer characteristics filter 16, first filter coefficient updater 17, and controller 19 may be implemented by using hardware such as circuits. Also, some of first adaptive filter 15, first simulated acoustic sound transfer characteristics filter 16, first filter coefficient updater 17, and controller 19 may be implemented by using software, and the remaining ones may be implemented by using hardware.

[Normal Operation]

Figure 3:
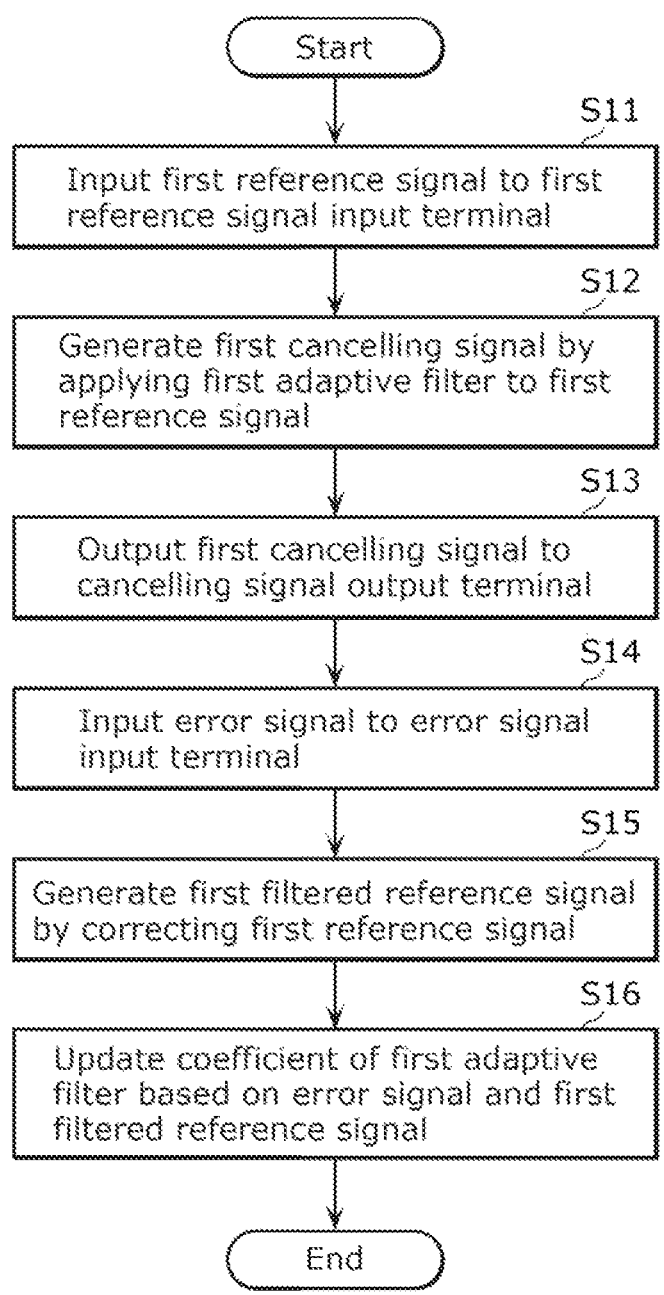
FIG. 3 is a flowchart of a normal operation performed by the active noise reduction device according to Embodiment 1.

As described above, active noise reduction device 10 performs a noise reduction operation. First, a normal operation performed by active noise reduction device 10 will be described with reference to FIGS. 2 and 3. FIG. 3 is a flowchart of the normal operation performed by active noise reduction device 10.

First, a first reference signal that has a correlation with noise N0 is input from first reference signal source 51 to first reference signal input terminal 11 (S11). First reference signal input terminal 11 is an example of a first reference signal inputter, and is specifically a terminal made of a metal or the like.

The reference signal input to first reference signal input terminal 11 is output to first adaptive filter 15 and first simulated acoustic sound transfer characteristics filter 16. First adaptive filter 15 generates a first cancelling signal by applying (convolving) a first adaptive filter to the first reference signal that is input to first reference signal input terminal 11 (S12). First adaptive filter 15 is implemented by using a so-called FIR filter or IIR filter. First adaptive filter 15 outputs the generated first cancelling signal to cancelling signal output terminal 12. The first cancelling signal is used to output first cancelling sound N1 for reducing noise N0, and is output to cancelling signal output terminal 12 (S13).

Cancelling signal output terminal 12 is an example of a cancelling signal outputter, and is a terminal made of a metal or the like. The first cancelling signal generated by first adaptive filter 15 is output to cancelling signal output terminal 12.

Cancelling signal output terminal 12 is connected to cancelling sound source 52. Accordingly, the first cancelling signal is output to cancelling sound source 52 via cancelling signal output terminal 12. Cancelling sound source 52 outputs first cancelling sound N1 based on the first cancelling signal.

Error signal source 53 detects a residual sound generated by interference between noise N0 and first cancelling sound N1 generated by cancelling sound source 52 to correspond to the first cancelling signal, and outputs an error signal that corresponds to the residual sound. As a result, the error signal is input to error signal input terminal 13 (S14). Error signal input terminal 13 is an example of an error signal inputter, and is a terminal made of a metal or the like.

Next, first simulated acoustic sound transfer characteristics filter 16 generates a first filtered reference signal by correcting the first reference signal by using acoustic sound transfer characteristics obtained by simulating simulated transfer characteristics from cancelling signal output terminal 12 to error signal input terminal 13 (S15). In other words, the simulated transfer characteristics are obtained by simulating acoustic sound transfer characteristics from the position of cancelling sound source 52 to the position of error signal source 53 (or in other words, the acoustic sound transfer characteristics in space 56). The simulated transfer characteristics are measured in, for example, space 56 and stored in first storage 18 in advance. The simulated transfer characteristics may be determined by using an algorithm that does not use predetermined values.

First storage 18 is a storage device that stores the simulated transfer characteristics. First storage 18 also stores the coefficient of the adaptive filter, which will be described later, and the like. First storage 18 is specifically implemented by using a semiconductor memory or the like. In the case where first adaptive filter 15, first simulated acoustic sound transfer characteristics filter 16, first filter coefficient updater 17, and controller 19 are implemented by using a processor such as a DSP, a control program that is executed by the processor is also stored in first storage 18. First storage 18 may also store other parameters that are used in signal processing operations performed by first adaptive filter 15, first simulated acoustic sound transfer characteristics filter 16, first filter coefficient updater 17, and controller 19.

First filter coefficient updater 17 sequentially updates first adaptive filter coefficient W based on the error signal and the generated first filtered reference signal (S16).

Specifically, first filter coefficient updater 17 calculates first adaptive filter coefficient W by using an LMS (Least Mean Square) method so as to minimize the sum of squares of the error signal, and outputs calculated first adaptive filter coefficient W to first adaptive filter 15. Also, first filter coefficient updater 17 sequentially updates first adaptive filter coefficient W. First adaptive filter coefficient W is expressed by Equation 1 given below, where the vector of the error signal is represented by e, and the vector of the first filtered reference signal is represented by R. Here, n is a natural number, and represents the n-th sample in sampling period Ts. µ is a scalar quantity, and is a step size parameter for determining the update amount of adaptive filter coefficient W per sample.

[Math. 1]

$$W(n+1)=W(n)-\mu \times e(n) \times R(b) \quad \text{(Equation 1)}$$

First filter coefficient updater 17 may update adaptive filter coefficient W by using a method other than the LMS method.

[Restriction Operation]

Next, a restriction operation performed by active noise reduction device 10 will be described. The acoustic sound transfer characteristics of space 56 of automobile 50 vary when a window of automobile 50 is opened or when the temperature of space 56 of automobile 50 varies. In this case, a difference occurs between the acoustic sound transfer characteristics of space 56 and the simulated transfer characteristics stored in first storage 18, and the noise control becomes unstable, as a result of which, first cancelling sound N1 may be transformed into an abnormal sound.

Figure 4:
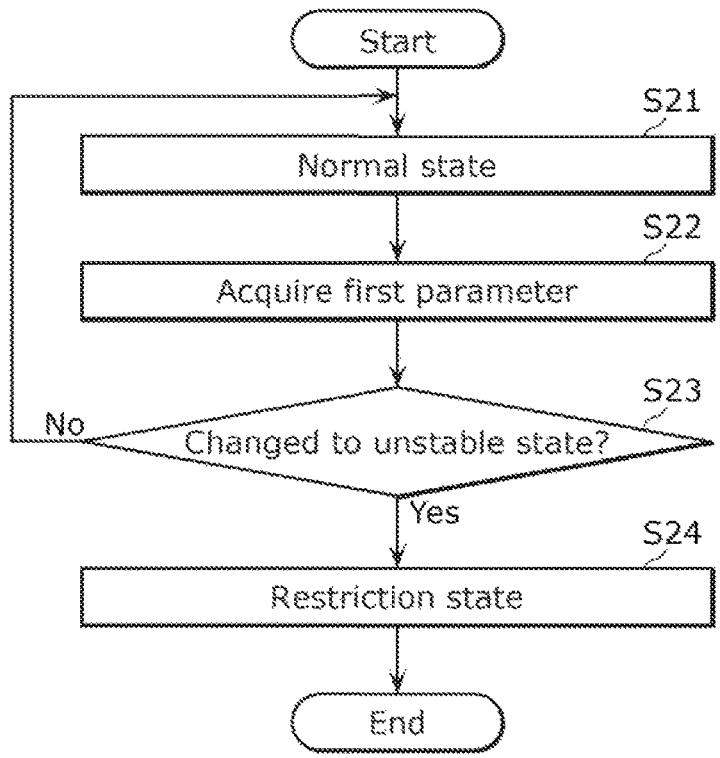
FIG. 4 is a flowchart of a restriction operation performed by the active noise reduction device according to Embodiment 1.

To address this, when it is determined that the noise control is unstable during the normal operation, controller 19 performs a restriction operation of transitioning first filter coefficient updater 17 to a restriction state in which the effect of reducing noise NO is smaller than in a normal state. Hereinafter, the restriction operation will be described with reference to FIG. 4. FIG. 4 is a flowchart of the restriction operation performed by active noise reduction device 10.

While active noise reduction device 10 is performing the normal operation and first filter coefficient updater 17 is updating first adaptive filter coefficient W in the normal state (S21), controller 19 acquires a first parameter of first adaptive filter 15 (S22). Controller 19 determines, based on the acquired first parameter, whether first noise control that is based on first cancelling sound N1 has changed from a stable state to an unstable state (S23).

The first parameter is, for example, first adaptive filter coefficient W, but may be absolute value |ΔW| of the update amount of first adaptive filter coefficient W. More specifically, ΔW is calculated based on a second term of Equation 1. Also, the first parameter may be the amplitude of the first cancelling signal that is output by first adaptive filter 15. Also, controller 19 may use, as the first parameter, two or more of first adaptive filter coefficient W, absolute value |ΔW| of the update amount of the first adaptive filter coefficient, and the level of the first cancelling signal. That is, it is sufficient that the first parameter includes at least one of first adaptive filter coefficient W, absolute value |ΔW| of the update amount of first adaptive filter coefficient W, and the level of the first cancelling signal.

It is considered that the first parameter takes a great value when the first noise control becomes unstable. Accordingly, for example, when the first parameter continuously remains to be greater than a first threshold value for a predetermined period or more while first filter coefficient updater 17 is in the normal state, controller 19 determines that the first noise control has changed from the stable state to the unstable state. The predetermined period and the first threshold value used in this case are determined empirically or experimentally as appropriate. Also, controller 19 may determine that the first noise control has changed from the stable state to the unstable state when it is determined that the first parameter exceeds the first threshold value a predetermined number of times or more in a predetermined period. The predetermined period, the first threshold value, and the predetermined number of times used in this case are determined empirically or experimentally as appropriate.

If it is determined that the first noise control is continuously in the stable state (No in S23), the normal state is continued (S21). On the other hand, if it is determined that the first noise control has changed from the stable state to the unstable state (Yes in S23), controller 19 transitions first filter coefficient updater 17 to the restriction state (S24). In other words, first filter coefficient updater 17 is transitioned to the restriction state based on an instruction from controller 19.

As described above, the restriction state is a state in which the effect of reducing noise NO is smaller than in the normal state (or a state in which it is estimated that the effect is reduced). For example, first filter coefficient updater 17 in the restriction state updates first adaptive filter coefficient W by using step size parameter p that is smaller than that used in the normal state. First filter coefficient updater 17 may initialize first adaptive filter coefficient W to 0, and then update first adaptive filter coefficient W by using small step size parameter μ. If the value of step size parameter μ is too large, the adaptive filter is likely to diverge. If the value is too small, first filter coefficient updater 17 cannot update adaptive filter coefficient W in time, and thus the effect of reducing noise NO decreases.

Also, first filter coefficient updater 17 in the restriction state may stop the update of first adaptive filter coefficient W. Specifically, first filter coefficient updater 17 in the restriction state sets step size parameter μ in Equation 1 given above to 0, and continuously outputs the same first adaptive filter coefficient W to first adaptive filter 15. First filter coefficient updater 17 may also stop the update of first adaptive filter coefficient W by setting W(n+1)=W(n), and not rewriting W. First filter coefficient updater 17 may initialize first adaptive filter coefficient W to 0, and then stop the update of first adaptive filter coefficient W.

Also, first filter coefficient updater 17 in the restriction state may stop the output of the first cancelling signal from first adaptive filter 15. For example, first filter coefficient updater 17 stops the output of first cancelling sound N1 by fixing first adaptive filter coefficient W to 0 (or in other words, by setting the amplitude of the first cancelling signal to 0). Also, first filter coefficient updater 17 in the restriction state may initialize first adaptive filter coefficient W to 0.

Also, first filter coefficient updater 17 in the restriction state may multiply first adaptive filter coefficient W by leak coefficient α that is less than 1. In addition, first filter coefficient updater 17 can fade out the first cancelling signal by stopping the update of first adaptive filter coefficient W and setting, for example, W(n+1)=αW(n).

In the manner described above, when it is determined that the first noise control is in the unstable state while first filter coefficient updater 17 is updating first adaptive filter coefficient W in the normal state, controller 19 transitions first filter coefficient updater 17 to the restriction state in which the effect of reducing the first noise is smaller than in the normal operation. By doing so, it is possible to prevent first cancelling sound N1 from being transformed into an abnormal sound while the first noise control is being performed.

Transition Back Operation of Example 1

Figure 5:
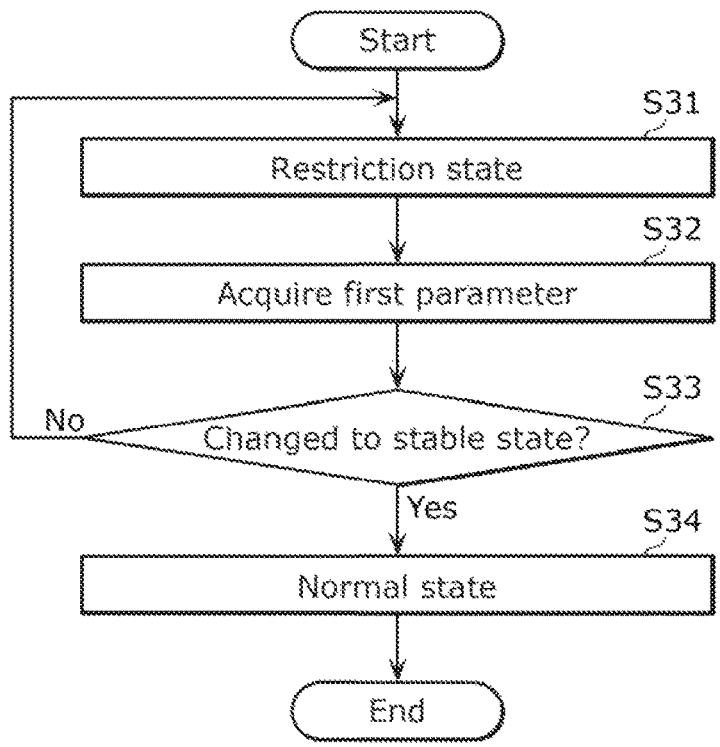
FIG. 5 is a flowchart of a transition back operation of example 1 performed by the active noise reduction device according to Embodiment 1.

In general, transitioning from the restriction operation back to the normal operation is performed when active noise control device 10 is reset such as when the ignition power supply of automobile 50 is turned off and again turned on. That is, an ordinary active noise reduction device is transitioned from a restriction operation back to a normal operation when the supply of power to the active noise reduction device is resumed. In contrast, in active noise reduction device 10, transitioning back to the normal operation can be performed even when the ignition power supply of automobile 50 is not turned off. Hereinafter, a transition back operation of example 1 performed in this case will be described with reference to FIG. 5. FIG. 5 is a flowchart of the transition back operation of example 1 performed by active noise reduction device 10.

While active noise reduction device 10 is performing the restriction operation, and first filter coefficient updater 17 is in the restriction state (S31), controller 19 acquires a first parameter of first adaptive filter 15 (S32). Controller 19 determines, based on the acquired first parameter, whether the first noise control has changed from the unstable state to the stable state (S33).

As described above, the first parameter is, for example, first adaptive filter coefficient W, but may be absolute value |ΔW| of the update amount of first adaptive filter coefficient W, or the level of the first cancelling signal. Also, controller 19 may use, as the first parameter, two or more of first adaptive filter coefficient W, absolute value |ΔW| of the update amount of the first adaptive filter coefficient, and the level of the first cancelling signal.

It is considered that the first parameter takes a small value when the first noise control becomes stable. Accordingly, for example, when the first parameter continuously remains to be less than a second threshold value for a predetermined period or more while first filter coefficient updater 17 is in the restriction state, controller 19 determines that the first noise control has changed from the unstable state to the stable state. The predetermined period and the second threshold value used in this case are determined empirically or experimentally as appropriate. The second threshold value may be the same as or different from the first threshold value. Also, controller 19 may determine that the first noise control has changed from the unstable state to the stable state when the first parameter reaches a value less than a second threshold value a predetermined number of times or more in a predetermined period. The predetermined period, the second threshold value, and the predetermined number of times used in this case are determined empirically or experimentally as appropriate. The second threshold value may be the same as or different from the first threshold value.

If it is determined that the first noise control is continuously in the unstable state (No in S33), the restriction operation (restriction state) is continued (S31). On the other hand, if it is determined that the first noise control has changed from the unstable state to the stable state (Yes in S33), controller 19 transitions first filter coefficient updater 17 back to the normal state (S34). In other words, first filter coefficient updater 17 is transitioned back to the normal state based on an instruction from controller 19.

As described above, controller 19 transitions first filter coefficient updater 17 back to the normal state when it is determined that the first noise control is in the stable state while first filter coefficient updater 17 is in the restriction state. By doing so, even when the ignition power supply is not turned off and on, active noise reduction device 10 can resume the normal operation at a timing at which it is estimated that the variation in the acoustic sound transfer characteristics is improved.

Transition Back Operation of Example 2

Figure 6:
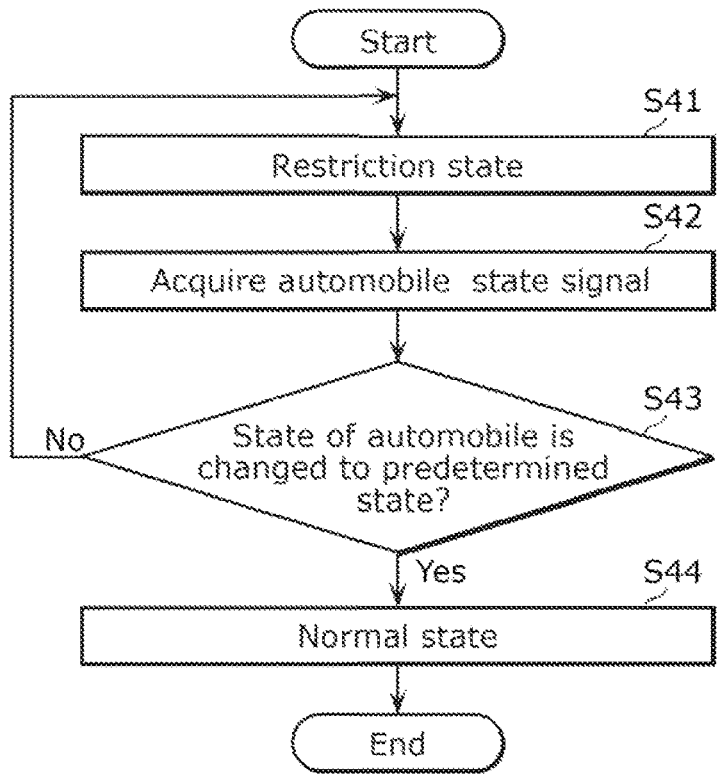
FIG. 6 is a flowchart of a transition back operation of example 2 performed by the active noise reduction device according to Embodiment 1.

Active noise reduction device 10 may perform transitioning from the restriction operation back to the normal operation based on information indicating the state of automobile 50. Hereinafter, a transition back operation of example 2 performed in this case will be described with reference to FIG. 6. FIG. 6 is a flowchart of the transition back operation of example 2 performed by active noise reduction device 10. Active noise reduction device 10 may perform both the transition back operation of example 1 and the transition back operation of example 2, or may perform only either one of the transition back operation of example 1 or the transition back operation of example 2.

While active noise reduction device 10 is performing the restriction operation, and first filter coefficient updater 17 is in the restriction state (S41), controller 19 acquires an automobile state signal that indicates the state of automobile 50 from automobile state signal input terminal 14 (S42). The automobile state signal is input to automobile state signal input terminal 14 by automobile controller 55 of automobile 50. Controller 19 determines, based on the acquired automobile state signal, whether the state of automobile 50 has changed to a predetermined state (S43).

The automobile state signal is a signal that indicates, for example, whether a window of automobile 50 is open or closed, and the predetermined state is a state in which, for example, the window of automobile 50 is closed. In this case, controller 19 determines, based on the acquired automobile state signal, whether the window of automobile 50 has changed from an open state to a closed state. As described above, when the window of automobile 50 is in the open state, a difference occurs between the acoustic sound transfer characteristics in space 56 of automobile 50 and the simulated transfer characteristics stored in first storage 18. However, when the window of automobile 50 is in the closed state, it is considered that the difference between the acoustic sound transfer characteristics and the simulated transfer characteristics decreases, and thus noise NO can be effectively reduced by performing the normal operation.

Alternatively, the automobile state signal may be a signal that indicates the internal temperature of automobile 50. In this case, the predetermined state is a state in which, for example, the temperature of space 56 is within a predetermined range. In this case, controller 19 determines, based on the acquired automobile state signal, whether the temperature of space 56 has changed from outside of the predetermined range to within the predetermine range. The simulated transfer characteristics stored in first storage 18 are set assuming that the temperature of space 56 is within the predetermined range. It is considered that, as long as the temperature of space 56 is within the predetermined range, the difference between the acoustic sound transfer characteristics and the simulated transfer characteristics decreases, and thus noise NO can be effectively reduced by performing the normal operation. The predetermined range is, for example, a range of 20° C. to 25° C., or the like.

If it is determined that the state of automobile 50 has not changed to the predetermined state (the state of automobile 50 remains in a non-predetermined state) (No in S43), the restriction operation (restriction state) is continued (S41). On the other hand, if it is determined that the state of automobile 50 has changed to the predetermined state (Yes in S43), controller 19 transitions first filter coefficient updater 17 back to the normal state (S44). In other words, first filter coefficient updater 17 is transitioned back to the normal state based on an instruction from controller 19.

In the manner described above, controller 19 transitions first filter coefficient updater 17 back to the normal state when the state of automobile 50 indicated by the acquired automobile state signal has changed to the predetermined state while first filter coefficient updater 17 is in the restriction state. By doing so, even when the ignition power supply is not turned off and on, active noise reduction device 10 can resume the normal operation at a timing at which it is estimated that the variation in the acoustic sound transfer characteristics is improved.

Transition Back Operation of Example 3

Active noise reduction device 10 may perform a transition back operation composed of a combination of the transition back operation of example 1 and the transition back operation of example 2. That is, controller 19 may transition first filter coefficient updater 17 back to the normal state in the following both cases: when it is determined that the first noise control is in the stable state while first filter coefficient updater 17 is in the restriction state; and when it is determined that the state of automobile 50 indicated by the acquired automobile state signal has changed to the predetermined state while first filter coefficient updater 17 is in the restriction state.

[Processing for Fixing to Restriction Operation]

Figure 7:
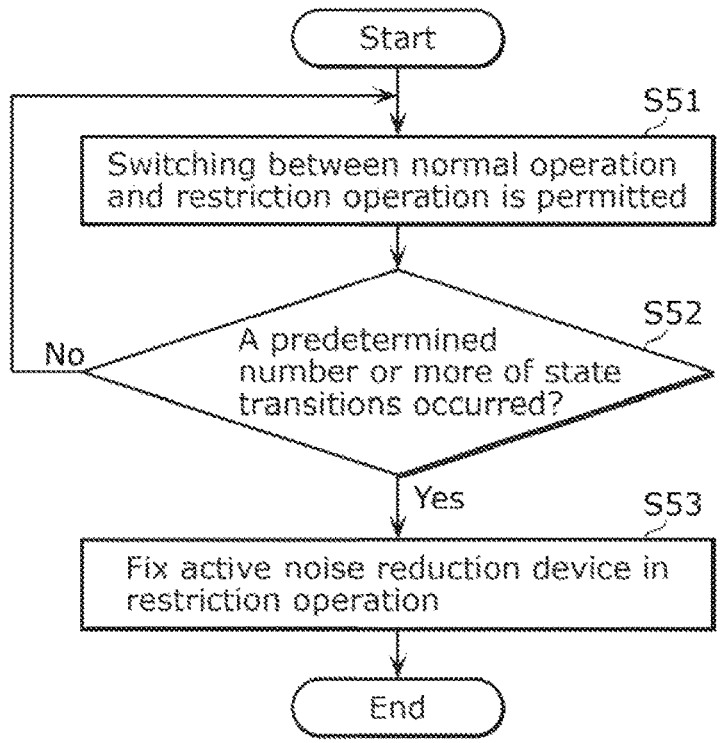
FIG. 7 is a flowchart of processing for fixing the active noise reduction device according to Embodiment 1 in the restriction operation.

Active noise reduction device 10 may be configured such that, in the case where transitioning from the unstable state to the stable state and transitioning from the stable state to the unstable state are frequently repeated, active noise reduction device 10 is fixed in the restriction operation, and does not transition back to the normal operation unless the ignition power supply is turned off and on. FIG. 7 is a flowchart of processing for fixing active noise reduction device 10 in the restriction operation.

In a state in which switching between the restriction operation and the normal operation is permitted (S51), controller 19 determines whether transitioning from the stable state to the unstable state and transitioning from the unstable state to the stable state have been performed a predetermined number of times or more in a predetermined period (S52). The predetermined period and the predetermined number of times used in this case are determined empirically or experimentally as appropriate.

If it is determined that transitioning from the stable state to the unstable state and transitioning from the unstable state to the stable state have not been performed a predetermined number of times or more in a predetermined period (No in S52), switching between the restriction operation and the normal operation is permitted (S51).

On the other hand, if it is determined that transitioning from the stable state to the unstable state and transitioning from the unstable state to the stable state have been performed a predetermined number of times or more in a predetermined period (Yes in S52), controller 19 fixes first filter coefficient updater 17 in the restriction state so as to fix active noise reduction device 10 in the restriction operation (S53).

In the manner described above, controller 19 fixes first filter coefficient updater 17 in the restriction state when it is determined that transitioning from the stable state to the unstable state and transitioning from the unstable state to the stable state have been performed a predetermined number of times or more in a predetermined period. By doing so, active noise reduction device 10 continuously performs the restriction operation when the variation in the acoustic sound transfer characteristics is not improved, and it is therefore possible to prevent first cancelling sound N1 from being transformed into an abnormal sound.

When active noise reduction device 10 is fixed in the restriction operation as described above, basically, active noise reduction device 10 does not transition back to the normal operation unless the ignition power supply is turned off and on. However, active noise reduction device 10 may transition back to the normal operation at a timing at which the state of automobile 50 indicated by the automobile state signal has changed to the predetermined state.

Specific Operation Example

Figure 8:
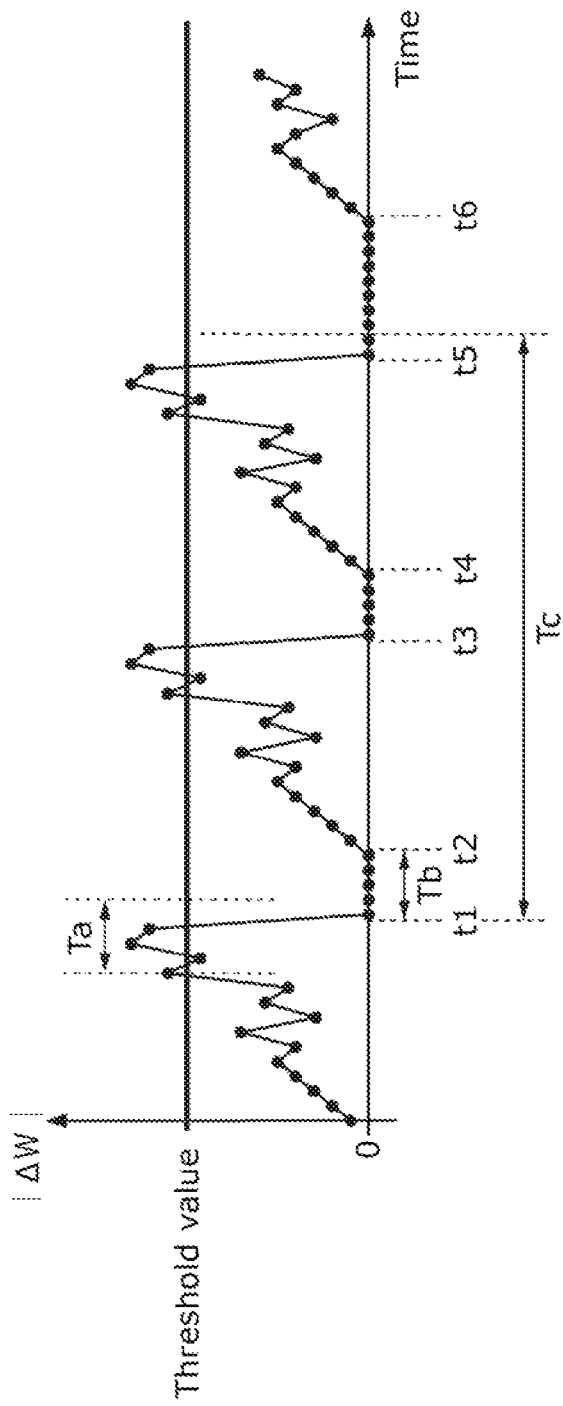
FIG. 8 is a diagram showing an example of a specific operation performed by the active noise reduction device according to Embodiment 1.

Hereinafter, a description will be given of an example of a specific operation of switching between the normal operation and the restriction operation by plotting variation of the first parameter in a graph. FIG. 8 is a diagram showing an example of a specific operation performed by active noise reduction device 10. The vertical axis shown in FIG. 8 indicates first parameter, and specifically, absolute value |ΔW| of the update amount of first adaptive filter coefficient W. The horizontal axis shown in FIG. 8 indicates time.

Active noise reduction device 10 initially performs the normal operation. In the normal operation, in the case where noise NO is stationary noise, at an early stage of adaptation, |ΔW| is large because the error relative to ideal coefficient W is large. However, |ΔW| converges toward 0 as the error becomes smaller. Actually, noise NO constantly varies, and thus |ΔW| repeatedly increases and decreases within a predetermined range. When the first noise control based on first cancelling sound N1 becomes unstable, |ΔW| increases at an accelerated pace and exceeds a threshold value. The threshold value shown in FIG. 8 corresponds to the first threshold value and the second threshold value described above.

When |ΔW| exceeds the threshold value a predetermined number of times or more for predetermined period Ta, controller 19 determines that the first noise control has changed from the stable state to the unstable state, and transitions first filter coefficient updater 17 to the restriction state at timing t1 at which the determination was made. That is, active noise reduction device 10 performs the restriction operation. In the example shown in FIG. 8, predetermined period Ta is a period starting from a timing at which |ΔW| once has exceeded the threshold value, and the predetermined number of times is three.

In the example shown in FIG. 8, first filter coefficient updater 17 in the restriction state stops the update of first adaptive filter coefficient W and then multiplies first adaptive filter coefficient W by a leak coefficient that is greater than 0 and smaller than 1, or fades out the cancelling sound. Accordingly, |ΔW| is set to 0.

When |ΔW| continuously remains to be less than the threshold value for predetermined period Tb, controller 19 determines that the first noise control has changed from the unstable state to the stable state, and transitions first filter coefficient updater 17 to the normal state at timing t2 at which the determination was made. That is, active noise reduction device 10 performs the normal operation. In the example shown in FIG. 8, predetermined period Tb is a period starting from a timing at which |ΔW| reached a value less than the threshold value.

After that, active noise reduction device 10 transitions from the normal operation to the restriction operation at timing t3, transitions from the restriction operation to the normal operation at timing t4, and transitions from the normal operation to the restriction operation at timing t5. That is, controller 19 determines that transitioning has been made from the stable state to the unstable state at timings t1, t3, and t5, and determines that transitioning has been made from the unstable state to the stable state at timings t2 and t4.

Controller 19 determines that transitioning from the stable state to the unstable state and transitioning from the unstable state to the stable state have been performed a predetermined number of times or more for predetermined period Tc, and fixes first filter coefficient updater 17 in the restriction state at timing t5 at which the determination was made. That is, active noise reduction device 10 performs the restriction operation after timing t5. In the example shown in FIG. 8, predetermined period Tc is a period starting from timing t1 at which the restriction operation was first performed (or in other words, it was first determined that the first noise control has changed to the unstable state), and the predetermined number of time is five.

First filter coefficient updater 17 is fixed in the restriction state at timing t5, and thus even when predetermined period Tb elapses after timing t5, first filter coefficient updater 17 is not transitioned back to the normal state. After that, at timing t6, controller 19 determines, based on the automobile state signal, that the window of automobile 50 has changed from the open stage to the closed state, and transitions first filter coefficient updater 17 back to the normal state. That is, active noise reduction device 10 transitions back to the normal operation.

Advantageous Effects, Etc.

As described above, active noise reduction device 10 includes: first reference signal input terminal 11 to which a first reference signal that has a correlation with first noise in space 56 of automobile 50 is input, the first reference signal being output by first reference signal source 51 attached to automobile 50; first adaptive filter 15 that generates a first cancelling signal by applying a first adaptive filter to the first reference signal that is input to first reference signal input terminal 11, the first cancelling signal being used to output first cancelling sound N1 for reducing the first noise; first filter coefficient updater 17 that updates a coefficient of the first adaptive filter; and controller 19 that determines, based on the first parameter of first adaptive filter 15, whether first noise control based on first cancelling sound N1 is in a stable state or an unstable state. Controller 19 transitions first filter coefficient updater 17 to a restriction state in which an effect of reducing the first noise is smaller than in a normal state when it is determined that the first noise control is in the unstable state while first filter coefficient updater 17 is updating the coefficient of the first adaptive filter in the normal state, and transitions first filter coefficient updater 17 back to the normal state when it is determined that the first noise control is in the stable state while first filter coefficient updater 17 is in the restriction state.

With active noise reduction device 10 configured as described above, first filter coefficient updater 17 can be transitioned back to the normal state when the first noise control becomes stable while preventing first cancelling sound N1 from being transformed into an abnormal sound as a result of first filter coefficient updater 17 being transitioned to the restriction state.

Also, for example, controller 19 determines that the first noise control is in the unstable state when the first parameter exceeds a first threshold value for a predetermined period or more.

With active noise reduction device 10 configured as described above, the requirement that the first parameter continuously exceeds the first threshold value can be used to determine that the first noise control is in the unstable state.

Also, for example, controller 19 determines that the first noise control is in the unstable state when the first parameter exceeds a first threshold value a predetermined number of times or more in a predetermined period.

With active noise reduction device 10 configured as described above, the requirement that the first parameter frequently exceeds the first threshold value can be used to determine that the first noise control is in the unstable state.

Also, for example, controller 19 determines that the first noise control is in the stable state when the first parameter is less than a second threshold value for a predetermined period or more.

With active noise reduction device 10 configured as described above, the requirement that the first parameter is continuously less than the second threshold value can be used to determine that the first noise control is in the stable state.

Also, for example, controller 19 determines that the first noise control is in the stable state when the first parameter reaches a value less than the second threshold value a predetermined number of times or more in a predetermined period.

With active noise reduction device 10 configured as described above, the requirement that the first parameter frequently reaches a value less than the second threshold value can be used to determine that the first noise control is in the stable state.

Also, for example, controller 19 fixes first filter coefficient updater 17 in the restriction state when it is determined that transitioning from the stable state to the unstable state and transitioning from the unstable state to the stable state have been performed a predetermined number of times or more in a predetermined period.

With active noise reduction device 10 configured as described above, by fixing first filter coefficient updater 17 in the restriction state when the first noise control is unstable, it is possible to prevent first cancelling sound N1 from being transformed into an abnormal sound.

Also, for example, controller 19 further acquires an automobile state signal that indicates the state of automobile 50, and transitions first filter coefficient updater 17 back to the normal state when the state of automobile 50 indicated by the acquired automobile state signal changes to a predetermined state while first filter coefficient updater 17 is in the restriction state.

With active noise reduction device 10 configured as described above, when the state of automobile 50 changes to a state in which the variation in the acoustic sound transfer characteristics of space 56 is improved, first filter coefficient updater 17 can be transitioned back to the normal state.

Also, for example, the predetermined state is a state in which a window of automobile 50 is closed.

With active noise reduction device 10 configured as described above, when the window of automobile 50 is closed, first filter coefficient updater 17 can be transitioned back to the normal state.

Also, for example, the predetermined state is a state in which space 56 has a temperature within a predetermined range.

With active noise reduction device 10 configured as described above, when the temperature of space 56 is in the predetermined range, first filter coefficient updater 17 can be transitioned back to the normal state.

Also, for example, the first parameter includes first adaptive filter coefficient W.

With active noise reduction device 10 configured as described above, it is possible to determine, based on first adaptive filter coefficient W, whether the first noise control is in the stable state or the unstable state.

Also, for example, the first parameter includes the update amount of first adaptive filter coefficient W.

With active noise reduction device 10 configured as described above, it is possible to determine, based on the update amount of first adaptive filter coefficient W, whether the first noise control is in the stable state or the unstable state.

Also, for example, the first parameter includes the amplitude of the first cancelling signal.

With active noise reduction device 10 configured as described above, it is possible to determine, based on the amplitude of the first cancelling signal, whether the first noise control is in the stable state or the unstable state.

Also, for example, first filter coefficient updater 17 in the restriction state updates first adaptive filter coefficient W by using a step size parameter smaller than a step size parameter used in the normal state.

With active noise reduction device 10 configured as described above, by setting the step size parameter to a small value, it is possible to prevent first cancelling sound N1 from being transformed into an abnormal sound.

Also, for example, first filter coefficient updater 17 in the restriction state stops the update of first adaptive filter coefficient W.

With active noise reduction device 10 configured as described above, by stopping the update of first adaptive filter coefficient W, it is possible to prevent first cancelling sound N1 from being transformed into an abnormal sound.

Also, for example, first filter coefficient updater 17 in the restriction state stops the output of the first cancelling signal from first adaptive filter 15.

With active noise reduction device 10 configured as described above, by stopping the output of the first cancelling signal, it is possible to prevent first cancelling sound N1 from being transformed into an abnormal sound.

Also, automobile 50 includes active noise reduction device 10 and first reference signal source 51.

With automobile 50 configured as described above, first filter coefficient updater 17 can be transitioned back to the normal state when the first noise control becomes stable while preventing first cancelling sound N1 from being transformed into an abnormal sound as a result of first filter coefficient updater 17 being transitioned to the restriction state.

Also, an active noise reduction method executed by active noise reduction device 10 includes: determining, based on a first parameter of first adaptive filter 15, whether first noise control based on first cancelling sound N1 is in a stable state or an unstable state; and performing control to transition first filter coefficient updater 17 to a restriction state in which an effect of reducing the first noise is smaller than in a normal state when it is determined that the first noise control is in the unstable state while first filter coefficient updater 17 is updating a coefficient of first adaptive filter 15 in the normal state, and transition first filter coefficient updater 17 back to the normal state when it is determined that the first noise control is in the stable state while first filter coefficient updater 17 is in the restriction state.

With the active noise reduction method as described above, it is possible to transition first filter coefficient updater 17 back to the normal state when the first noise control becomes stable while preventing first cancelling sound N1 from being transformed into an abnormal sound as a result of first filter coefficient updater 17 being transitioned to the restriction state.

Embodiment 2

[Configuration of Automobile]

Figure 9:
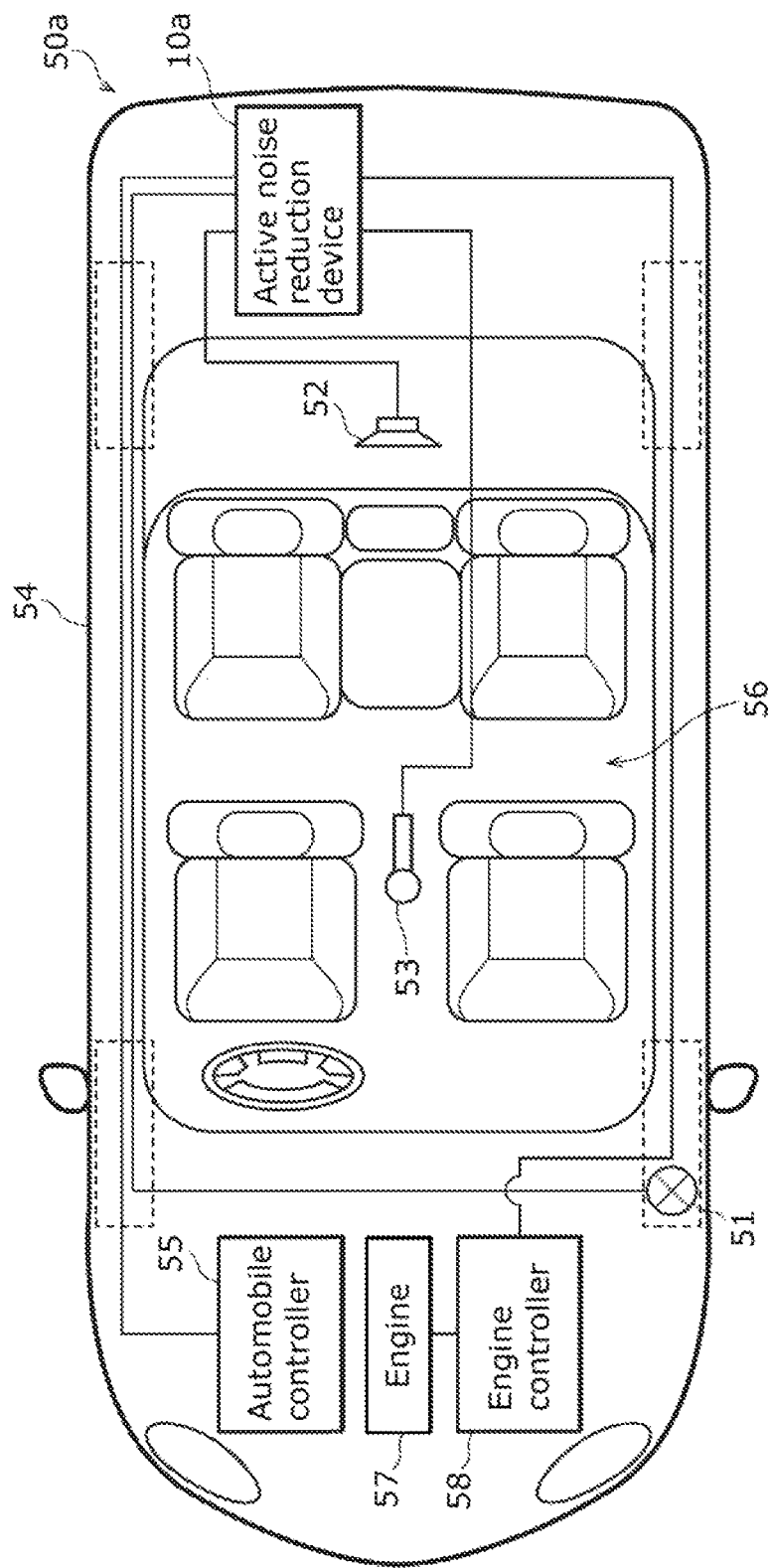
FIG. 9 is a schematic diagram of an automobile according to Embodiment 2 as viewed from above.

Hereinafter, an automobile according to Embodiment 2 and an active noise reduction device that is mounted on the automobile will be described. First, the automobile according to Embodiment 2 will be described. FIG. 9 is a schematic diagram of the automobile according to Embodiment 2 as viewed from above.

Figure 10:
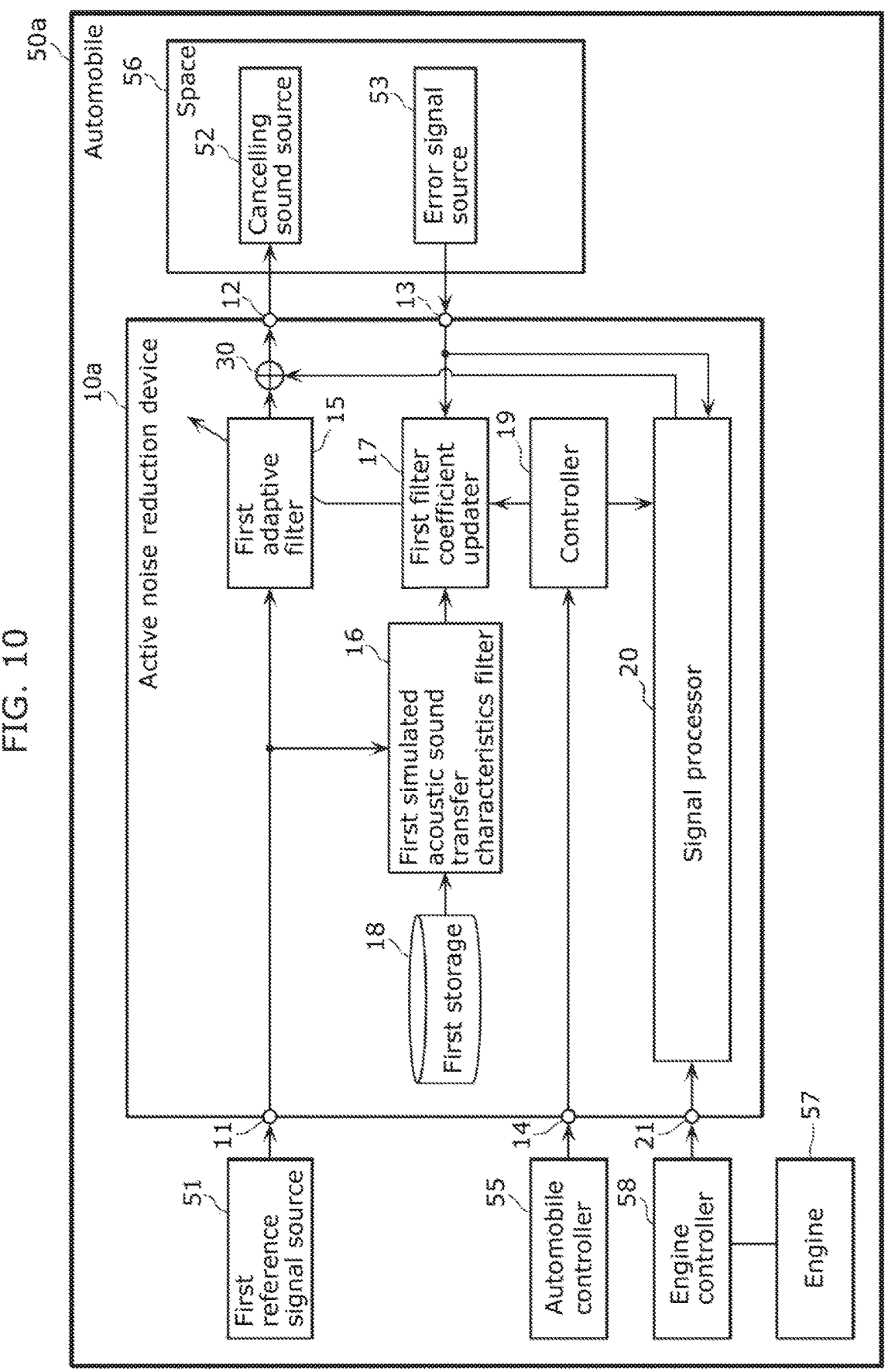
FIG. 10 is a block diagram showing a functional configuration of an active noise reduction device according to Embodiment 2.

Automobile 50a shown in FIGS. 9 and 10 includes engine 57 and engine controller 58 in addition to the structural elements of automobile 50.

Engine 57 is a driving device that serves as a power source of automobile 50a and a noise source that produces noise in space 56. Engine 57 is disposed in, for example, a space that is different from space 56.

Engine controller 58 controls (drives) engine 57 based on an acceleration operation and the like of the driver of automobile 50a. Also, engine controller 58 outputs a pulse signal (engine pulse signal) according to the number of revolutions (frequency) of engine 57 as a second reference signal. Engine controller 58 is an example of a second reference signal source. The frequency of the pulse signal is proportional to, for example, the number of revolutions (frequency) of engine 57. Specifically, the pulse signal is a so-called tachopulse or the like. The second reference signal may be in any form as long as the second reference signal has a correlation with noise.

[Configuration of Active Noise Reduction Device]

Also, automobile 50a includes active noise reduction device 10a. FIG. 10 is a block diagram showing a functional configuration of active noise reduction device 10a.

Active noise reduction device 10a includes second reference signal input terminal 21, signal processor 20, and adder 30 in addition to the structural elements of active noise reduction device 10.

Second reference signal input terminal 21 is an example of a second reference signal inputter, and a second reference signal output by engine controller 58 is input to second reference signal input terminal 21. Specifically, second reference signal input terminal 21 is a terminal made of a metal or the like.

Figure 11:
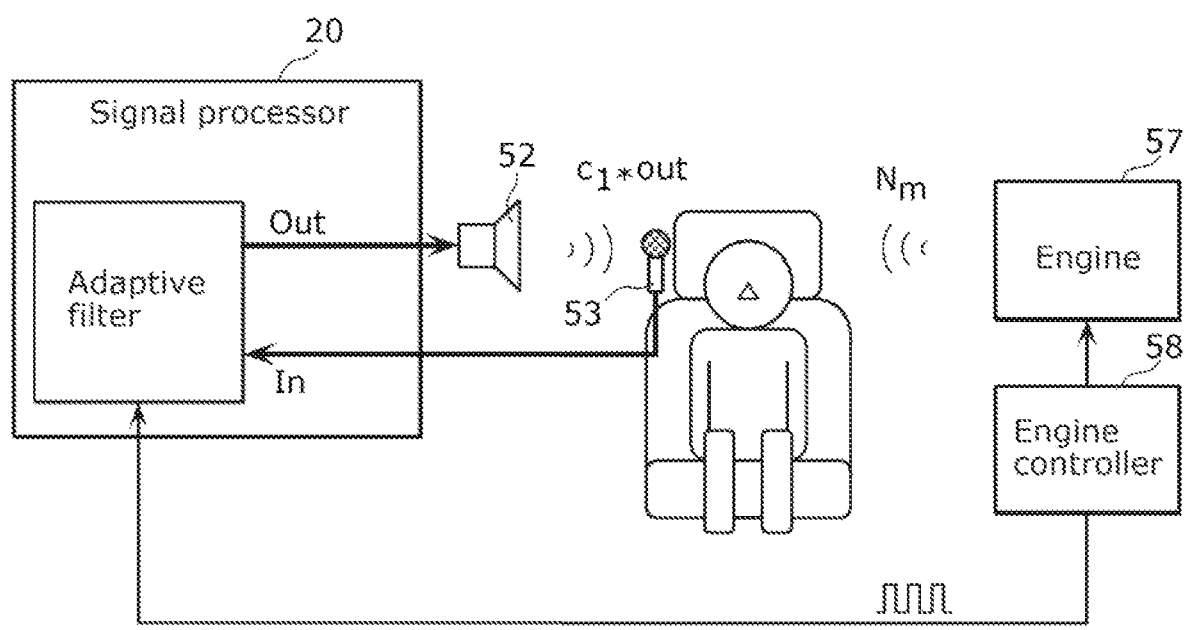
FIG. 11 is a diagram showing an overall operation of a signal processor.

Signal processor 20 performs signal processing for reducing noise (hereinafter also referred to as "second noise") based on the sound of engine 57. The second noise is, for example, a muffled sound based on the sound of engine 57. The second noise is instantaneously a sound close to a sine wave of a single frequency. Accordingly, signal processor 20 acquires the second reference signal that indicates the frequency of engine 57 from engine controller 58 that controls engine 57, and outputs a second cancelling sound for cancelling out the second noise from cancelling sound source 52. The generation of the second cancelling sound is performed using an adaptive filter, and the second cancelling sound is generated such that the residual sound acquired by error signal source 53 is small. FIG. 11 is a diagram showing an overall operation of signal processor 20.

As shown in FIG. 11, the transfer characteristics from the position of cancelling sound source 52 (hereinafter also referred to as "sound output position") to the position of error signal source 53 (hereinafter also referred to as "sound recording position") are represented by $c_1$, and the second cancelling signal for outputting the second cancelling sound is represented by a sign "out". In this case, the second cancelling sound that arrives at the position of error signal source 53 (sound recording position) is represented by a sign "$c_1$*out". Here, a sign "*" indicates a convolutional operator, $c_1$ indicates an impulse response of transfer characteristics, and $C_1$ indicates simulated transfer characteristics in a frequency domain.

Second noise $N_m$ at the position of error signal source 53 is expressed by Equation 2 given below, where amplitude is represented by R, angular frequency is represented by ω, and phase is represented by θ. Also, the sign "$c_1$*out" is expressed by Equation 3-1 and Equation 3-2 given below. Active noise reduction device 10a can output the second cancelling sound for cancelling out second noise $N_m$ by calculating first filter coefficient A and second filter coefficient B in Equation 3-1 and Equation 3-2 based on, for example, an LMS method.

[Math. 2]

$$N_m = R \times \sin(\omega t + \theta) \qquad \text{(Equation 2)}$$

$$c_1\text{*out} = R \times \sin[\omega t + (\theta - \pi)]$$

When $C_1 = 1$, $$c_1\text{*out} = R \times \sin[\omega t + (\theta - \pi)] = A \times \sin(\omega t) + B \times \cos(\omega t)$$

Where $$R = \sqrt{A^2 + B^2}, \theta - \pi = \tan^{-1}(B/A) \qquad \text{(Equation 3-1)}$$

When $C_1 \neq 1$, $$c_1\text{*out} = R \times \sin[\omega t + (\theta - \pi)] = A' \times \sin(\omega t) + B' \times \cos(\omega t)$$

$$R = \sqrt{A'^2 + B'^2}, \theta - \pi = \tan^{-1}(B'/A') \qquad \text{(Equation 3-2)}$$

Where $$A' + jB' = C_1(\omega)(A + jB)$$

As described above, as a result of the second cancelling sound with a phase opposite to that of second noise $N_m$ being output, the noise heard at the position of error signal source 53 is reduced.

[Detailed Configuration of Signal Processor and Normal Operation of Signal Processor]

Figure 12:
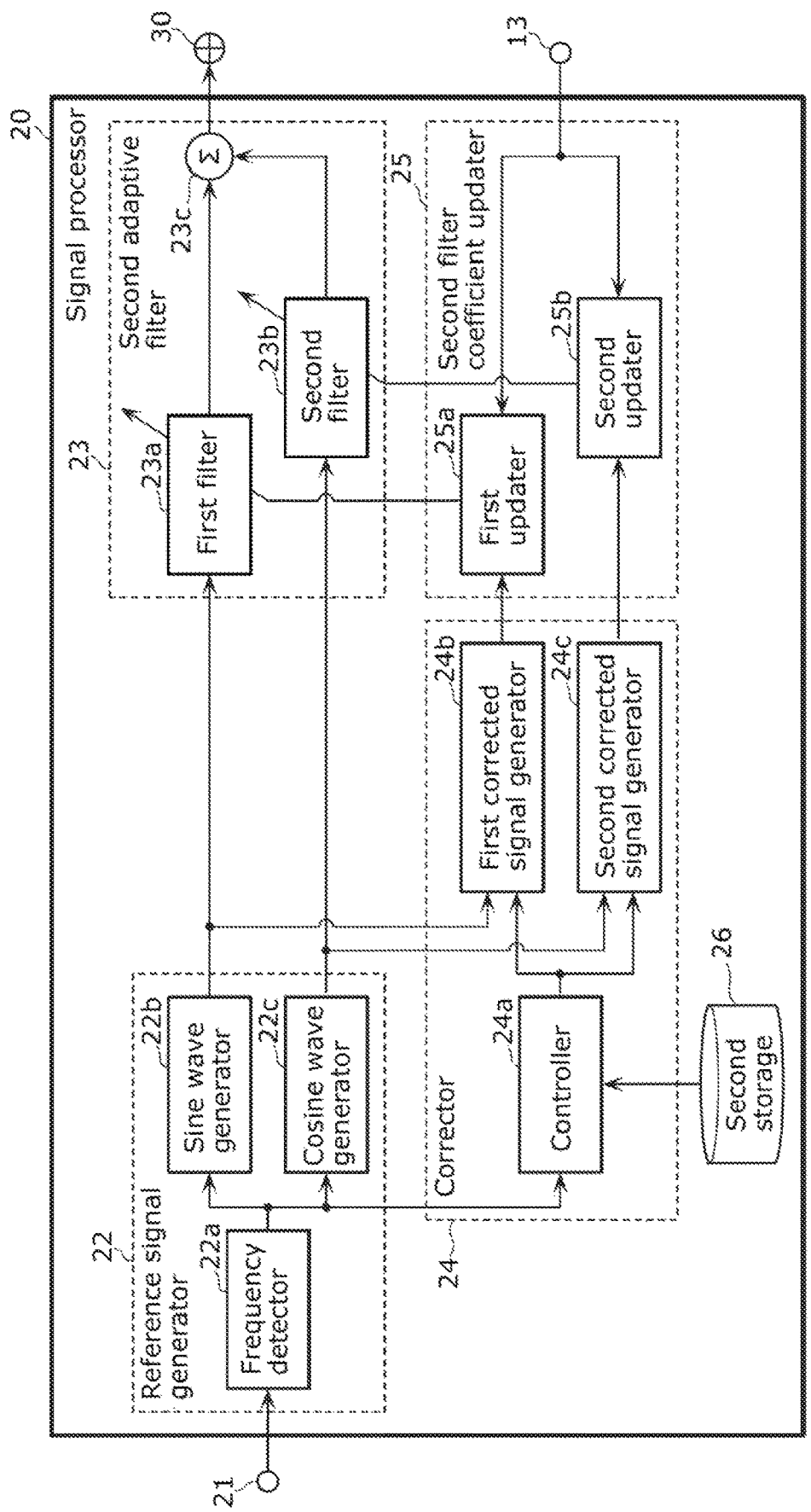
FIG. 12 is a functional block diagram of a signal processor.
Figure 13:
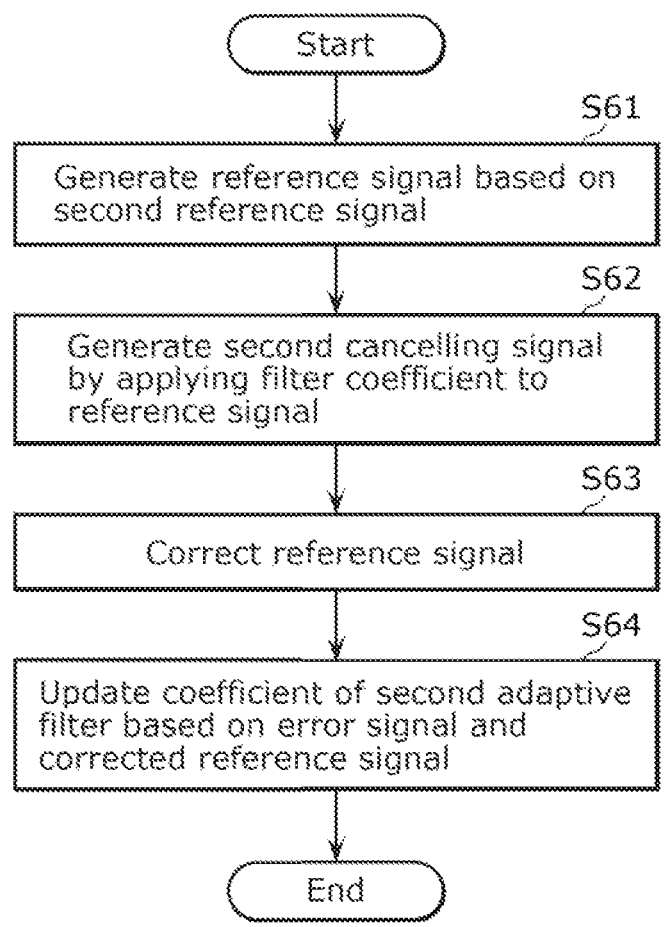
FIG. 13 is a flowchart of a normal operation performed by the signal processor.

Next, a detailed configuration of signal processor 20 and a normal operation performed by signal processor 20 will be described with reference to FIGS. 12 and 13 in addition to FIGS. 9 to 11. FIG. 12 is a functional block diagram of signal processor 20. FIG. 13 is a flowchart of a normal operation performed by signal processor 20.

As shown in FIG. 12, signal processor 20 includes reference signal generator 22, second adaptive filter 23, corrector 24, second filter coefficient updater 25, and second storage 26. Reference signal generator 22, second adaptive filter 23, corrector 24 and second filter coefficient updater 25 are implemented by, for example, a processor such as a DSP or a microcomputer executing software. Hereinafter, related structural elements will be described in detail for each step of the flowchart shown in FIG. 13.

[Generation of Reference Signal]

First, reference signal generator 22 generates a reference signal based on a reference signal input to second reference signal input terminal 21 (S61 shown in FIG. 13). More specifically, reference signal generator 22 identifies an instantaneous frequency of the second noise based on the second reference signal input to second reference signal input terminal 21, and generates a reference signal that has the identified frequency. Reference signal generator 22 specifically includes frequency detector 22a, sine wave generator 22b, and cosine wave generator 22c.

Frequency detector 22a detects the frequency of the pulse signal, and outputs the detected frequency to sine wave generator 22b, cosine wave generator 22c, and corrector 24. In other words, frequency detector 22a identifies the instantaneous frequency of the second noise.

Sine wave generator 22b outputs a sine wave of the frequency detected by frequency detector 22a as a first reference signal. The first reference signal is an example of a reference signal, and is a signal expressed by $\sin(2\pi ft) = \sin(\omega t)$, where the frequency detected by frequency detector 22a is represented by f. That is, the first reference signal has the frequency identified by frequency detector 22a (the same frequency as that of the second noise). The first reference signal is output to first filter 23a of second adaptive filter 23 and first corrected signal generator 24b of corrector 24.

Cosine wave generator 22c outputs a cosine wave of the frequency detected by frequency detector 22a as a second reference signal. The second reference signal is an example of a reference signal, and is a signal expressed by $\cos(2\pi ft) = \cos(\omega t)$, where the frequency detected by frequency detector 22a is represented by f. That is, the second reference signal has the frequency identified by frequency detector 22a (the same frequency as that of the second noise). The second reference signal is output to second filter 23b of second adaptive filter 23 and second corrected signal generator 24c of corrector 24.

[Generation of Second Cancelling Signal]

Second adaptive filter 23 generates a second cancelling signal by applying a coefficient of the second adaptive filter to the reference signal generated by reference signal generator 22 (by multiplying the reference signal by the coefficient) (S62 in FIG. 13). In other words, second adaptive filter 23 applies the coefficient of the second adaptive filter to the second reference signal that was input to second reference signal input terminal 21 and was converted to a reference signal. The second cancelling signal is used to output the second cancelling sound for reducing the second noise, and is output to adder 30. Second adaptive filter 23 includes first filter 23a, second filter 23b, and adder 23c. Second adaptive filter 23 is a so-called adaptive notch filter.

First filter 23a multiplies the first reference signal output from sine wave generator 22b by a first filter coefficient. The first filter coefficient used in the multiplication is a filter coefficient that corresponds to A in Equation 3-1 and Equation 3-2 given above, and is sequentially updated by first updater 25a of second filter coefficient updater 25. The first reference signal multiplied by the first filter coefficient is output to adder 23c.

Second filter 23b multiplies the second reference signal output from cosine wave generator 22c by a second filter coefficient. The second filter coefficient used in the multiplication is a filter coefficient that corresponds to B in Equation 3-1 and Equation 3-2 given above, and is sequentially updated by second updater 25b of second filter coefficient updater 25. The second reference signal multiplied by the second filter coefficient is output to adder 23c.

Adder 23c adds the first reference signal that was multiplied by the first filter coefficient and output from first filter 23a and the second reference signal that was multiplied by the second filter coefficient and output from second filter 23b. Adder 23c outputs, to adder 30, a second cancelling signal obtained by the addition of the first reference signal multiplied by the first filter coefficient and the second reference signal multiplied by the second filter coefficient.

[Correction of Reference Signal]

Corrector 24 generates corrected reference signals by applying the simulated transfer characteristics stored in second storage 26 to the reference signals. That is, corrector 24 generates corrected reference signals by correcting the reference signals (S63 in FIG. 13). Corrector 24 includes controller 24a, first corrected signal generator 24b, and second corrected signal generator 24c.

Specifically, the simulated transfer characteristics include a gain and a phase (phase delay) for each frequency. The simulated transfer characteristics are measured in, for example, space 56 for each frequency, and stored in second storage 26 in advance. That is, the gain and the phase used to correct the signal of the frequency are stored in second storage 26.

Controller 24a acquires a frequency output by frequency detector 22a, and reads a gain and a phase that correspond to the acquired frequency from second storage 26. Also, controller 24a outputs the read gain and the read phase.

First corrected signal generator 24b generates a first corrected reference signal by correcting the first reference signal based on the gain and the phase output by controller 24a. The first corrected reference signal is an example of a corrected reference signal. The first corrected reference signal is expressed by $\alpha \cdot \sin(\omega t + \varphi\alpha)$, where the gain and the phase output by controller are represented by $\alpha$ and $\varphi\alpha$, respectively. The generated first corrected reference signal is output to first updater 25a of second filter coefficient updater 25.

Second corrected signal generator 24c generates a second corrected reference signal by correcting the second reference signal based on the gain and the phase output by controller 24a. The second corrected reference signal is an example of a corrected reference signal. The second corrected reference signal is expressed by $\beta \cdot \cos(\omega t + \varphi\beta)$, where the gain and the phase output by controller 24a are represented by $\beta$ and $\varphi\beta$, respectively. The generated second corrected reference signal is output to second updater 25b of second filter coefficient updater 25.

Second storage 26 is a storage device that stores the simulated transfer characteristics. Second storage 26 also stores the coefficient of the second adaptive filter and the like. Second storage 26 is specifically implemented by using a semiconductor memory or the like. In the case where signal processor 20 is implemented by using a processor such as a DSP, a control program that is executed by the processor is also stored in second storage 26. Second storage 26 may also store other parameters that are used in signal processing performed by signal processor 20.

[Update of Filter Coefficient]

Second filter coefficient updater 25 sequentially updates the coefficient (including the first filter coefficient and the second filter coefficient) of the second adaptive filter based on the error signal input to error signal input terminal 13 and the generated corrected reference signal (S64 in FIG. 13).

Specifically, second filter coefficient updater 25 includes first updater 25a and second updater 25b.

First updater 25a calculates the first filter coefficient based on the first corrected reference signal acquired from first corrected signal generator 24b and the error signal acquired from error signal source 53. Specifically, first updater 25a calculates the first filter coefficient by using an LMS method so as to minimize the error signal, and outputs the calculated first filter coefficient to first filter 23a. Also, first updater 25a sequentially updates the first filter coefficient. First filter coefficient A (corresponding to A in Equation 3-1 and Equation 3-2 given above) is expressed by Equation 4 given below, where the first corrected reference signal is represented by $r_1$ and the error signal is represented by e. Here, n is a natural number and is a variable that indicates how many times updating has been performed (or in other words, a variable that indicates the number of updates). That is, A(n) indicates a state at the n-th update. $\mu$ is a scalar quantity, and is a step size parameter for determining the update amount of the filter coefficient per sample.

[Math. 3]

$$A(n) = A(n-1) - \mu \times r_1(n) \times e(n) \qquad \text{(Equation 4)}$$

Second updater 25b calculates the second filter coefficient based on the second corrected reference signal acquired from second corrected signal generator 24c and the error signal acquired from error signal source 53. Specifically, second updater 25b calculates the second filter coefficient by using an LMS method so as to minimize the error signal, and outputs the calculated second filter coefficient to second filter 23b. Also, second updater 25b sequentially updates the second filter coefficient. Second filter coefficient B (corresponding to B in Equation 3-1 and Equation 3-2 given above) is expressed by Equation 5 given below, where the second corrected reference signal is represented by $r_2$, and the error signal is represented by e.

[Math. 4]

$$B(n)=B(n-1)-\mu \times r_2(n) \times e(n) \quad \text{(Equation 5)}$$

[Normal Operation of Active Noise Reduction Device]

As described in Embodiment 1, first adaptive filter 15 generates the first cancelling signal by applying the first adaptive filter to the first reference signal input to first reference signal input terminal 11. The first cancelling signal is a signal for outputting the first cancelling sound for reducing the first noise (roadway noise). Here, the first noise control based on the first cancelling sound is noise control based on a filtered-X LMS algorithm, and first filter coefficient updater 17 updates first adaptive filter coefficient W based on the filtered-X LMS algorithm.

Also, as described in Embodiment 2, second adaptive filter 23 generates the second cancelling signal by applying the coefficient of the second adaptive filter to the reference signal generated by reference signal generator 22. The second cancelling signal is a signal for outputting the second cancelling sound for reducing the second noise (a muffled sound based on the sound of engine 57). Here, second noise control based on the second cancelling sound is noise control based on an SAN (Single-frequency Adaptive Notch filter) algorithm, and second filter coefficient updater 25 updates the coefficient of the second adaptive filter based on the SAN algorithm.

First adaptive filter 15 and second adaptive filter 23 may update adaptive filter coefficients W, A, and B by using a method other than the LMS method and the SAN algorithm.

Adder 30 of active noise reduction device 10a adds the first cancelling signal output from first adaptive filter 15 and the second cancelling signal output from second adaptive filter 23, and outputs a cancelling signal obtained as a result of the addition to cancelling signal output terminal 12. Adder 30 is implemented by using, for example, a processor such as a DSP, but may be implemented by using an addition circuit that uses a microcomputer, an operational amplifier, or the like.

As described above, when the cancelling signal obtained as a result of the addition is output from adder 30 to cancelling signal output terminal 12, a cancelling sound generated by combining the first cancelling sound and the second cancelling sound is output from cancelling sound source 52. By doing so, active noise reduction device 10a can reduce both the first noise in space 56 and the second noise.

In active noise reduction device 10a, only one cancelling sound source 52 is used in both the first noise control and the second noise control, but the cancelling sound source that outputs the first cancelling signal and the cancelling sound source that outputs the second cancelling signal may be different.

[Restriction Operation of Active Noise Reduction Device]

Here, as in active noise reduction device 10, in active noise reduction device 10a as well, controller 19 can determine whether the first noise control based on the first cancelling sound is in the stable state or the unstable state. Also, in active noise reduction device 10a, controller 19 can determine whether the second noise control based on the second cancelling sound of signal processor 20 is in the stable state or the unstable state. Specifically, controller 19 can determine, based on the second parameter related to second adaptive filter 23, whether the second noise control is in the stable state or the unstable state.

The second parameter is, for example, the coefficient (including first filter coefficient A and second filter coefficient B described above) of the second adaptive filter, but may be the absolute value of the update amount of the coefficient of the second adaptive filter, coefficient R, or the level of the second cancelling signal output by second adaptive filter 23. Also, controller 19 may use, as the second parameter, two or more of the coefficient of the second adaptive filter, the absolute value of the update amount of the coefficient of the second adaptive filter, coefficient R, and the level of the second cancelling signal. That is, it is sufficient that the second parameter includes at least one of the coefficient of the second adaptive filter, the absolute value of the update amount of the coefficient of the second adaptive filter, coefficient R, and the level of the second cancelling signal. The method for determining whether the second noise control is in the stable state or the unstable state based on the second parameter is the same as that used in Embodiment 1.

Also, controller 19 can switch the state of second filter coefficient updater 25 between the normal state and the restriction state based on the result of determination. For example, controller 19 transitions second filter coefficient updater 25 to the restriction state in which the effect of reducing the second noise is smaller than in the normal state when it is determined that the second noise control is in the unstable state while second filter coefficient updater 25 is updating the coefficient of the second adaptive filter in the normal state.

The restriction state is a state in which the effect of reducing the second noise is smaller than in the normal state (or a state in which it is estimated that the effect is reduced). For example, second filter coefficient updater 25 in the restriction state updates the coefficient of the second adaptive filter by using step size parameter μ that is smaller than that used in the normal state. Second filter coefficient updater 25 in the restriction state may stop the update of the coefficient of the second adaptive filter, stop the output of the second cancelling signal from second adaptive filter 23, or initialize the second adaptive filter coefficient to 0. Also, second filter coefficient updater 25 in the restriction state may set an upper limit for coefficient R. Also, second filter coefficient updater 25 in the restriction state may multiply coefficients A and B of the second adaptive filter by a leak coefficient that is less than 1.

Also, controller 19 transitions second filter coefficient updater 25 back to the normal state when it is determined that the second noise control is in the stable state while second filter coefficient updater 25 is in the restriction state. Controller 19 can also transition second filter coefficient updater 25 back to the normal state when the state of automobile 50a indicated by the acquired automobile state signal has changed to the predetermined state while second filter coefficient updater 25 is in the restriction state.

Also, controller 19 can also fix second filter coefficient updater 25 in the restriction state when it is determined that transitioning from the stable state to the unstable state and transitioning from the unstable state to the stable state have been performed a predetermined number of times or more in a predetermined period.

Specific Example of Restriction Operation of Active Noise Reduction Device

Figure 14:
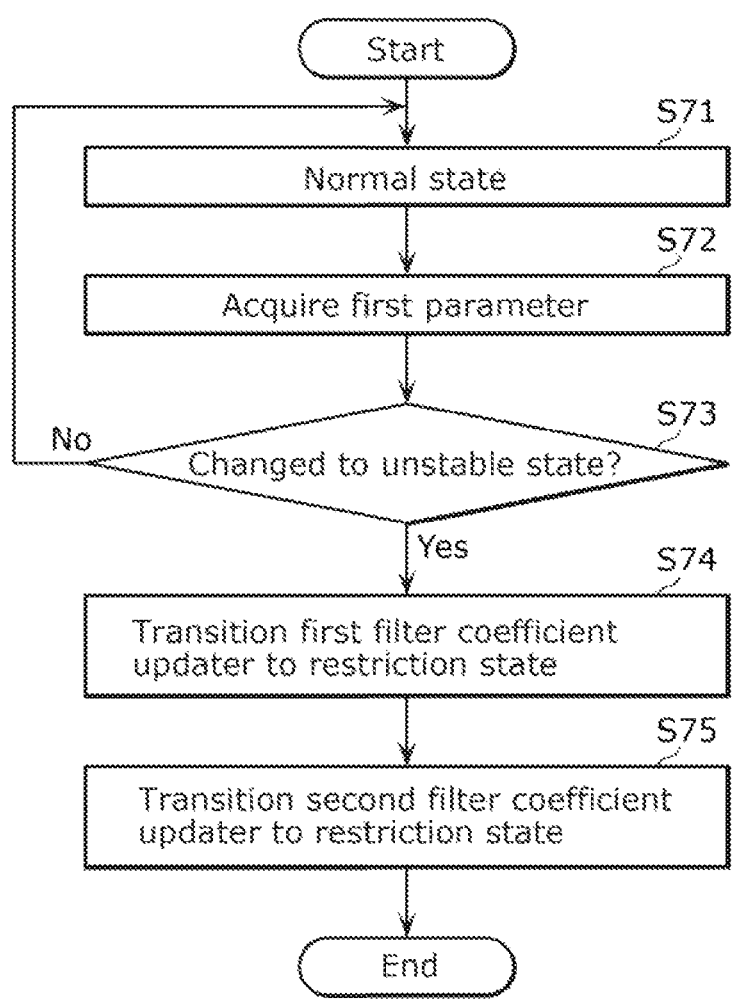
FIG. 14 is a flowchart of a restriction operation of example 1 performed by the active noise reduction device according to Embodiment 2.

As described above, controller 19 can separately determine whether the first noise control is in the unstable state and whether the second noise control is in the unstable state. Here, controller 19 may change the state of the filter coefficient updater that performs another noise control based on the result of determination as to one of the first noise control and the second noise control. FIG. 14 is a flowchart of a restriction operation of example 1 performed by active noise reduction device 10a.

While active noise reduction device 10a is performing the normal operation, first filter coefficient updater 17 is updating first adaptive filter coefficient W in the normal state, and second filter coefficient updater 25 is updating the coefficient of the second adaptive filter in the normal state (S71), controller 19 acquires a first parameter of first adaptive filter 15 (S72). Controller 19 determines, based on the acquired first parameter, whether the first noise control has changed from the stable state to the unstable state (S73).

If it is determined that the first noise control remains in the stable state (No in S73), the normal state is continued (S71). On the other hand, if it is determined that the first noise control has changed from the stable state to the unstable state (Yes in S73), controller 19 transitions first filter coefficient updater 17 to the restriction state (S74), and also transitions second filter coefficient updater 25 to the restriction state (S75).

In the manner described above, controller 19 transitions second filter coefficient updater 25 to the restriction state when it is determined that the first noise control is in the unstable state while second filter coefficient updater 25 is in the normal state. With active noise reduction device 10 configured as described above, it is possible to prevent the second cancelling sound from being transformed into an abnormal sound when the first noise control based on the first cancelling sound becomes unstable.

Figure 15:
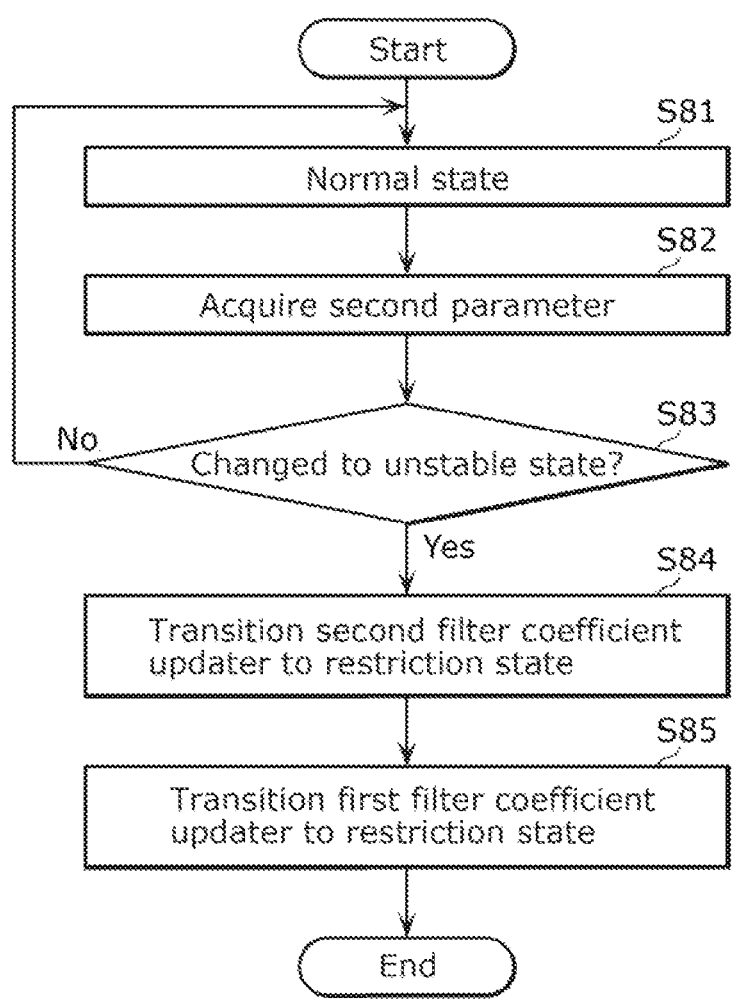
FIG. 15 is a flowchart of a restriction operation of example 2 performed by the active noise reduction device according to Embodiment 2.

FIG. 15 is a flowchart of a restriction operation of example 2 performed by active noise reduction device 10a.

While active noise reduction device 10a is performing the normal operation, first filter coefficient updater 17 is updating first adaptive filter coefficient W in the normal state, and second filter coefficient updater 25 is updating coefficients A and B of the second adaptive filter in the normal state (S81), controller 19 acquires a second parameter of second adaptive filter 23 (S82). Controller 19 determines, based on the acquired second parameter, whether the second noise control has changed from the stable state to the unstable state (S83).

If it is determined that the second noise control remains in the stable state (No in S83), the normal state is continued (S81). On the other hand, if it is determined that the first noise control has changed from the stable state to the unstable state (Yes in S83), controller 19 transitions second filter coefficient updater 25 to the restriction state (S84), and also transitions first filter coefficient updater 17 to the restriction state (S85).

In the manner described above, controller 19 transitions first filter coefficient updater 17 to the restriction state when it is determined that the second noise control is in the unstable state while first filter coefficient updater 17 is in the normal state. With active noise reduction device 10 configured as described above, it is possible to prevent the first cancelling sound from being transformed into an abnormal sound when the second noise control based on the second cancelling sound becomes unstable.

Although not shown in the diagrams, in active noise reduction device 10a, whether first filter coefficient updater 17 in the restriction state is transitioned back to the normal state may be determined based on whether the requirement that both the first noise control and the second noise control are in the stable state is satisfied. Likewise, whether second filter coefficient updater 25 in the restriction state is transitioned back to the normal state may be determined based on whether the requirement that both the first noise control and the second noise control are in the stable state is satisfied.

Advantageous Effects, Etc

As described above, active noise reduction device 10a includes: second reference signal input terminal 21 to which a second reference signal that has a correlation with second noise in a space in automobile 50a is input, the second reference signal being output by engine controller 58 attached to automobile 50a; second adaptive filter 23 that generates a second cancelling signal by applying a second adaptive filter to a reference signal that has a frequency identified based on the second reference signal input to second reference signal input terminal 21, the second cancelling signal being used to output a second cancelling sound for reducing the second noise; and second filter coefficient updater 25 that updates a coefficient of the second adaptive filter based on an SAN algorithm. Controller 19 determines, based on a second parameter of second adaptive filter 23, whether second noise control based on the second cancelling sound is in a stable state or in an unstable state. Controller 19 transitions second filter coefficient updater 25 to a restriction state in which an effect of reducing the second noise is smaller than in a normal state when it is determined that the second noise control is in the unstable state while second filter coefficient updater 25 is updating the coefficient of the second adaptive filter in the normal state, and transitions second filter coefficient updater 25 back to the normal state when it is determined that the second noise control is in the stable state while second filter coefficient updater 25 is in the restriction state. First filter coefficient updater 17 updates a coefficient of a first adaptive filter based on a filtered-X LMS algorithm.

With active noise reduction device 10 configured as described above, it is possible to transition second filter coefficient updater 25 back to the normal state when the second noise control becomes stable while preventing the second cancelling sound from being transformed into an abnormal sound as a result of second filter coefficient updater 25 being transitioned to the restriction state.

Also, controller 19 transitions first filter coefficient updater 17 to the restriction state when it is determined that the second noise control is in the unstable state while first filter coefficient updater 17 is in the normal state, and transitions second filter coefficient updater 25 to the restriction state when it is determined that the first noise control is in the unstable state while second filter coefficient updater 25 is in the normal state.

With active noise reduction device 10a configured as described above, it is possible to prevent the second cancelling sound from being transformed into an abnormal sound when the first noise control based on the first cancelling sound becomes unstable. Also, with active noise reduction device 10a, it is possible to prevent the first cancelling sound from being transformed into an abnormal sound when the second noise control based on the second cancelling sound becomes unstable.

The first noise is roadway noise, and the second noise is noise based on the engine sound of automobile 50a.

With active noise reduction device 10a configured as described above, it is possible to reduce both the roadway noise and the noise based on the engine sound.

OTHER EMBODIMENTS

Up to here, Embodiments 1 and 2 have been described. However, the present disclosure is not limited to Embodiments 1 and 2 given above.

For example, Embodiment 1 given above was described focusing mainly on an active noise reduction device for reducing roadway noise, and Embodiment 2 given above was described focusing mainly on an active noise reduction device for reducing roadway noise and a muffled sound. However, the invention envisaged in the present disclosure also encompasses an active noise reduction device for reducing mainly a muffled sound. The active noise reduction device for reducing mainly a muffled sound has the same configuration as that of the active noise reduction device of Embodiment 2 except that, for example, the structural elements for reducing roadway noise are excluded.

Also, the active noise reduction devices according to Embodiments 1 and 2 given above may be incorporated in a vehicle other than an automobile. The vehicle may be, for example, an aircraft or a vessel. Also, the present disclosure may be implemented as a vehicle other than an automobile.

The configurations of the active noise reduction device according to Embodiments 1 and 2 given above are merely examples. For example, the active noise reduction devices may include a structural element such as a D/A converter, a filter, a power amplifier, or an A/D converter.

Also, in Embodiments 1 and 2 given above, the first reference signal inputter, the error signal inputter, and the cancelling signal outputter were described as different terminals, but may be configured as a single terminal. For example, by using a digital communication standard with which devices such as the first reference signal source, the error signal source, and the cancelling sound source can be connected in a chain, the reference signal inputter, the error signal inputter, and the cancelling signal outputter can be implemented by using a single terminal.

Also, the processing performed by the active noise reduction devices according to Embodiments 1 and 2 given above is merely an example. For example, a portion of the digital signal processing described in the embodiments given above may be implemented by analog signal processing.

Also, for example, in Embodiments 1 and 2 given above, the processing performed by a specific processor may be performed by another processor. Also, the order in which a plurality of processing operations are performed may be changed, and a plurality of processing operations may be performed in parallel.

Also, in Embodiments 1 and 2 given above, the structural elements may be implemented by executing a software program suitable for the structural element. The structural elements may be implemented by a program executor such as a CPU or a processor reading a software program recorded in a recording medium such a hard disk or a semiconductor memory and executing the software program.

Also, in Embodiments 1 and 2 given above, the structural elements may be implemented by using hardware. For example, the structural element may be circuits (or integrated circuits). These circuits may constitute one circuit as a whole, or may be separate circuits. Also, each of these circuits may be a general-purpose circuit or a dedicated circuit.

Also, the structural elements may be circuits (or integrated circuits). These circuits may constitute one circuit as a whole, or may be separate circuits. Also, each of these circuits may be a general-purpose circuit or a dedicated circuit.

Also, general and specific aspects of the present disclosure may be implemented by using a system, a device, a method, an integrated circuit, a computer program, or a computer-readable non-transitory recording medium such as a CD-ROM. Alternatively, general and specific aspects of the present disclosure may be implemented by using any combination of systems, devices, methods, integrated circuits, computer programs, or computer-readable recording media.

For example, the present disclosure may be implemented as an active noise reduction method that is executed by an active noise reduction device (a computer or a DSP), or may be implemented as a program for causing a computer or a DSP to execute the active noise reduction method. Also, the present disclosure may be implemented as a computer-readable non-transitory recording medium in which the program is recorded. Also, the present disclosure may be implemented as a vehicle (for example, an automobile) or an active noise reduction system. The vehicle or the active noise reduction system described above includes, for example, the active noise reduction device and the first reference signal source according to the embodiments given above.

The present disclosure also encompasses other embodiments obtained by making various modifications that can be conceived by a person having ordinary skill in the art to the above embodiments as well as embodiments implemented by any combination of the structural elements and the functions of the above embodiments without departing from the scope of the present invention.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings and claims is incorporated herein by reference in its entirety: Japanese Patent Application No. 2021-3086 filed on Jan. 12, 2021.

INDUSTRIAL APPLICABILITY

The active noise reduction device according to the present disclosure is useful as a device that can reduce noise in, for example, an automobile cabin.

The invention claimed is:
1. An active noise reduction device, comprising:
a first reference signal inputter to which a first reference signal that has a correlation with first noise in a space in a vehicle is input, the first reference signal being output by a first reference signal source attached to the vehicle;
a first adaptive filter that is applied to the first reference signal that is input to the first reference signal inputter to generate a first cancelling signal, the first cancelling signal being used to output a first cancelling sound for reducing the first noise;
a first filter coefficient updater that updates a coefficient of the first adaptive filter; and
a controller that performs, based on a first parameter of the first adaptive filter, first noise control based on the first cancelling sound,
wherein the controller:
  determines whether the first noise control based on the first cancelling sound is in a stable state or an unstable state;
  instructs, via a first instruction, the first filter coefficient updater to transition to a restriction state in which an effect of reducing the first noise is smaller than in a normal state when the controller determines that the first noise control is in the unstable state while the first filter coefficient updater is updating the coefficient of the first adaptive filter in the normal state; and
  instructs, via a second instruction, the first filter coefficient updater to transition back to the normal state when the controller determines that the first noise control is in the stable state while the first filter coefficient updater is in the restriction state,
wherein the controller determines that the first noise control is in the unstable state when the first parameter exceeds a first threshold value a first predetermined number of times or more in a first predetermined period,
wherein the controller determines that the first noise control is in the stable state when the first parameter reaches a value less than a second threshold value a second predetermined number of times or more in a second predetermined period,
wherein the controller acquires a state signal that indicates a state of the vehicle, and instructs, via a third instruction signal, the first filter coefficient updater to transition back to the normal state when the state of the vehicle indicated by the state signal changes to a predetermined state while the first filter coefficient updater is in the restriction state, and
wherein the predetermined state includes a state in which a window of the vehicle is closed.

2. The active noise reduction device according to claim 1, wherein the controller further determines that the first noise control is in the unstable state when the first parameter exceeds the first threshold value for a third predetermined period or more.

3. The active noise reduction device according to claim 1, wherein the controller further determines that the first noise control is in the stable state when the first parameter is less than the second threshold value for a third predetermined period or more.

4. The active noise reduction device according to claim 1, wherein the controller fixes the first filter coefficient updater in the restriction state when transitioning from the stable state to the unstable state and transitioning from the unstable state to the stable state are made a third predetermined number of times or more in a third predetermined period.

5. The active noise reduction device according to claim 1, wherein the predetermined state further includes a second state in which the space has a temperature within a predetermined range.

6. The active noise reduction device according to claim 1, wherein the first parameter includes the coefficient of the first adaptive filter.

7. The active noise reduction device according to claim 1, wherein the first parameter includes an update amount of the coefficient of the first adaptive filter.

8. The active noise reduction device according to claim 1, wherein the first parameter includes an amplitude of the first cancelling signal.

9. The active noise reduction device according to claim 1, wherein the first filter coefficient updater in the restriction state updates the coefficient of the first adaptive filter by using a step size parameter smaller than a step size parameter used in the normal state.

10. The active noise reduction device according to claim 1, wherein the first filter coefficient updater in the restriction state stops update of the coefficient of the first adaptive filter.

11. The active noise reduction device according to claim 1, wherein the first filter coefficient updater in the restriction state stops output of the first cancelling signal from the first adaptive filter.

12. The active noise reduction device according to claim 1, wherein the first filter coefficient updater updates the coefficient of the first adaptive filter based on a filtered-X least-mean-square (LMS) algorithm,
the active noise reduction device further comprises:
  a second reference signal inputter to which a second reference signal that has a correlation with second noise in the space in the vehicle is input, the second reference signal being output by a second reference signal source attached to the vehicle;
  a second adaptive filter that is applied to a reference signal, that has a frequency identified based on the second reference signal that is input to the second reference signal inputter, to generate a second cancelling signal, the second cancelling signal being used to output a second cancelling sound for reducing the second noise; and
  a second filter coefficient updater that updates a coefficient of the second adaptive filter based on a single-frequency adaptive notch filter (SAN) algorithm,
the controller further performs, based on a second parameter of the second adaptive filter, second noise control based on the second cancelling sound, and
the controller:
  determines whether the second noise control based on the second cancelling sound is in a stable state or an unstable state;
  instructs, via a third instruction, the second filter coefficient updater to transition to a restriction state in which an effect of reducing the second noise is smaller than in the normal state when the controller determines that the second noise control is in the unstable state while the second filter coefficient updater is updating the coefficient of the second adaptive filter in the normal state; and
  instructs, via a fourth instruction, the second filter coefficient updater to transition back to the normal state when the controller determines that the second noise control is in the stable state while the second filter coefficient updater is in the restriction state.

13. The active noise reduction device according to claim 12,
wherein the vehicle is an automobile,
the first noise is roadway noise, and
the second noise is noise based on an engine sound of the automobile.

14. A vehicle comprising:
the active noise reduction device according to claim 1; and
the first reference signal source.

15. An active noise reduction device, comprising:
a first reference signal inputter to which a first reference signal that has a correlation with first noise in a space in a vehicle is input, the first reference signal being output by a first reference signal source attached to the vehicle;
a first adaptive filter that is applied to the first reference signal that is input to the first reference signal inputter to generate a first cancelling signal, the first cancelling signal being used to output a first cancelling sound for reducing the first noise;
a first filter coefficient updater that updates a coefficient of the first adaptive filter; and
a controller that performs, based on a first parameter of the first adaptive filter, first noise control based on the first cancelling sound,
wherein the controller:
determines whether the first noise control based on the first cancelling sound is in a stable state or an unstable state;
instructs, via a first instruction, the first filter coefficient updater to transition to a restriction state in which an effect of reducing the first noise is smaller than in a normal state when the controller determines that the first noise control is in the unstable state while the first filter coefficient updater is updating the coefficient of the first adaptive filter in the normal state; and
instructs, via a second instruction, the first filter coefficient updater to transition back to the normal state when the controller determines that the first noise control is in the stable state while the first filter coefficient updater is in the restriction state,
the first filter coefficient updater updates the coefficient of the first adaptive filter based on a filtered-X least-mean-square (LMS) algorithm,
the active noise reduction device further comprises:
a second reference signal inputter to which a second reference signal that has a correlation with second noise in the space in the vehicle is input, the second reference signal being output by a second reference signal source attached to the vehicle;
a second adaptive filter that is applied to a reference signal, that has a frequency identified based on the second reference signal that is input to the second reference signal inputter, to generate a second cancelling signal, the second cancelling signal being used to output a second cancelling sound for reducing the second noise; and
a second filter coefficient updater that updates a coefficient of the second adaptive filter based on a single-frequency adaptive notch filter (SAN) algorithm,
the controller further performs, based on a second parameter of the second adaptive filter, second noise control based on the second cancelling sound,
the controller:
determines whether the second noise control based on the second cancelling sound is in a stable state or an unstable state;
instructs, via a third instruction, the second filter coefficient updater to transition to a restriction state in which an effect of reducing the second noise is smaller than in the normal state when the controller determines that the second noise control is in the unstable state while the second filter coefficient updater is updating the coefficient of the second adaptive filter in the normal state; and
instructs, via a fourth instruction, the second filter coefficient updater to transition back to the normal state when the controller determines that the second noise control is in the stable state while the second filter coefficient updater is in the restriction state, and
the controller instructs the first filter coefficient updater to transition to the restriction state when the controller determines that the second noise control is in the unstable state while the first filter coefficient updater is in the normal state, and instructs the second filter coefficient updater to transition to the restriction state when the controller determines that the first noise control is in the unstable state while the second filter coefficient updater is in the normal state.

16. An active noise reduction method executed by an active noise reduction device,
the active noise reduction device including:
a first adaptive filter generating a first cancelling signal, that is applied to a first reference signal, the first reference signal having a correlation with first noise in a space in a vehicle and being output by a first reference signal source attached to the vehicle, the first cancelling signal being used to output a first cancelling sound for reducing the first noise; and
a first filter coefficient updater that updates a coefficient of the first adaptive filter, and
the active noise reduction method comprising:
performing, by a controller and based on a first parameter of the first adaptive filter, first noise control based on the first cancelling sound;
determining, by the controller, whether the first noise control based on the first cancelling sound is in a stable state or an unstable state;
instructing, by the controller and via a first instruction, the first filter coefficient updater to transition to a restriction state in which an effect of reducing the first noise is smaller than in a normal state when the controller determines that the first noise control is in the unstable state while the first filter coefficient updater is updating the coefficient of the first adaptive filter in the normal state; and
instructing, by the controller and via a second instruction, the first filter coefficient updater to transition back to the normal state when the controller determines that the first noise control is in the stable state while the first filter coefficient updater is in the restriction state,
wherein the controller determines that the first noise control is in the unstable state when the first parameter exceeds a first threshold value a first predetermined number of times or more in a first predetermined period,
wherein the controller determines that the first noise control is in the stable state when the first parameter reaches a value less than a second threshold value a second predetermined number of times or more in a second predetermined period, wherein the controller acquires a state signal that indicates a state of the vehicle, and instructs, via a third instruction signal, the first filter coefficient updater to transition back to the normal state when the state of the vehicle indicated by the state signal changes to a predetermined state while the first filter coefficient updater is in the restriction state, and wherein the predetermined state is a state in which a window of the vehicle is closed.

* * * * *